Dec. 19, 1922.

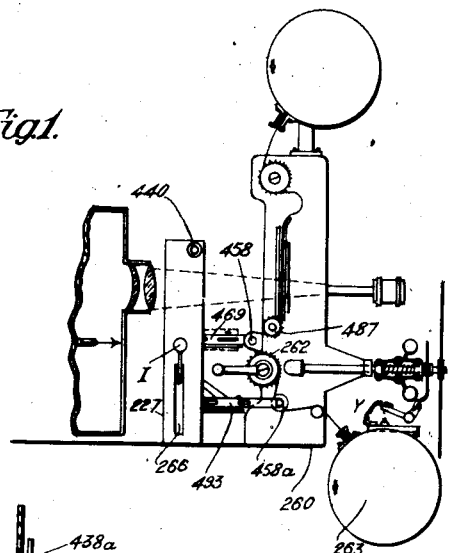
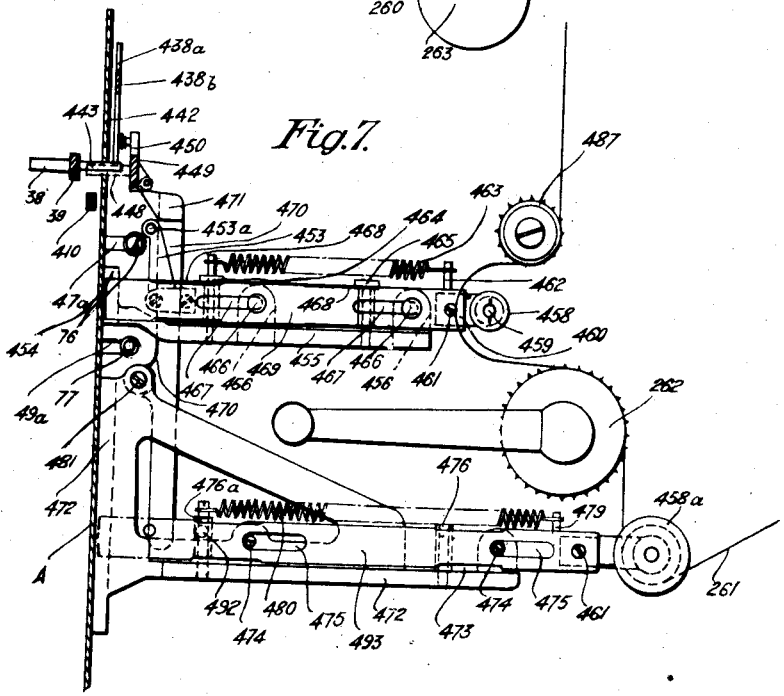

R. M. GEYER ET AL.
CINEMATOGRAPH SAFETY CONTROL APPARATUS.
FILED FEB. 25, 1921.

1,439,091.

Inventors
Roy Marcus Geyer
William Herbert Tripp
Per:- Rayner & Co
Attorneys.

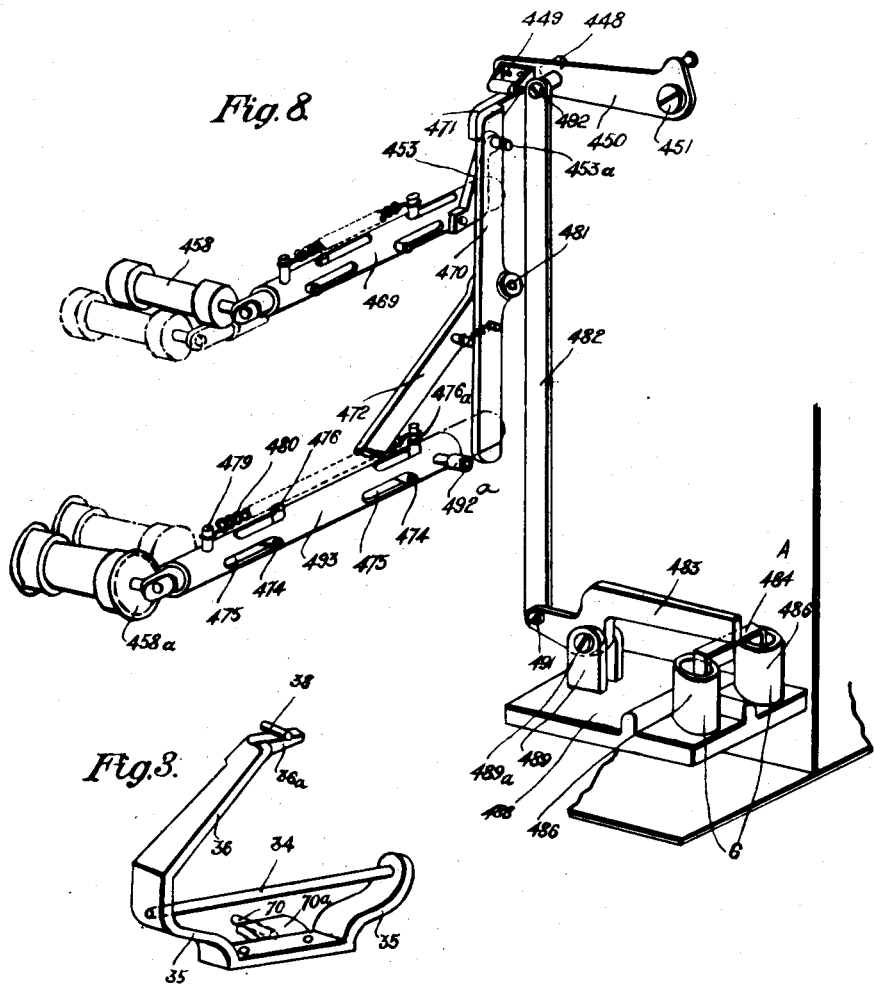

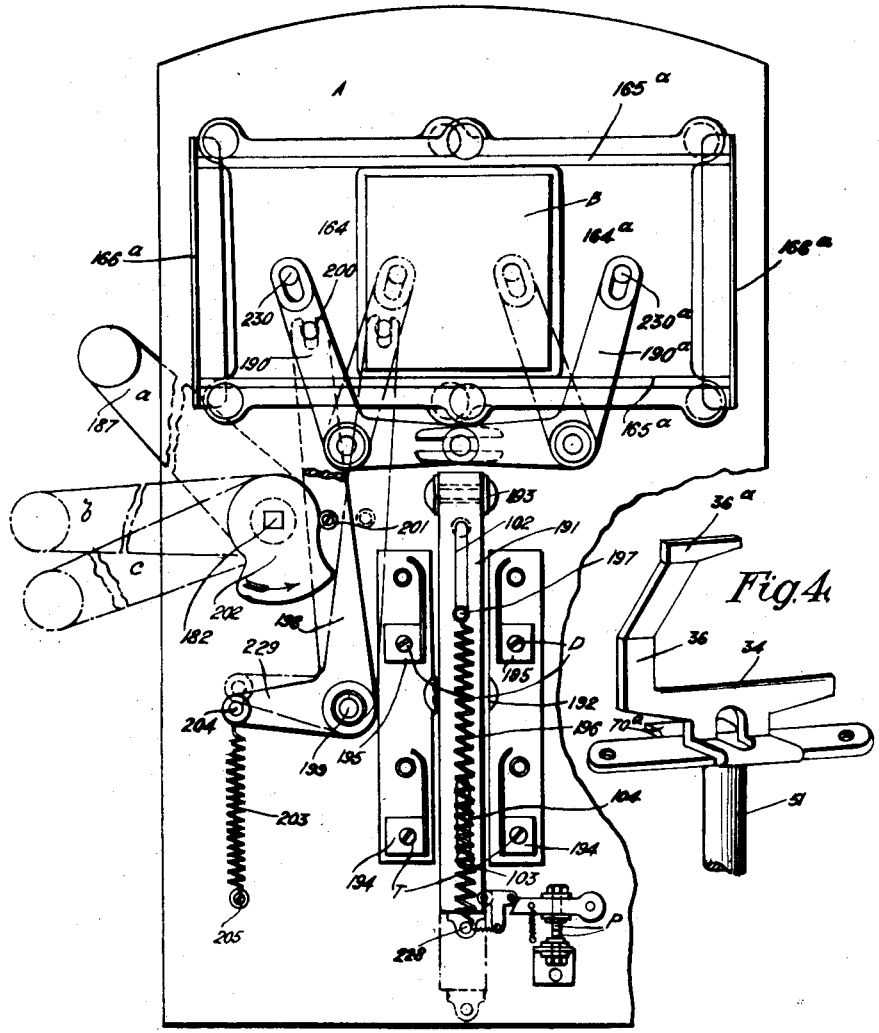

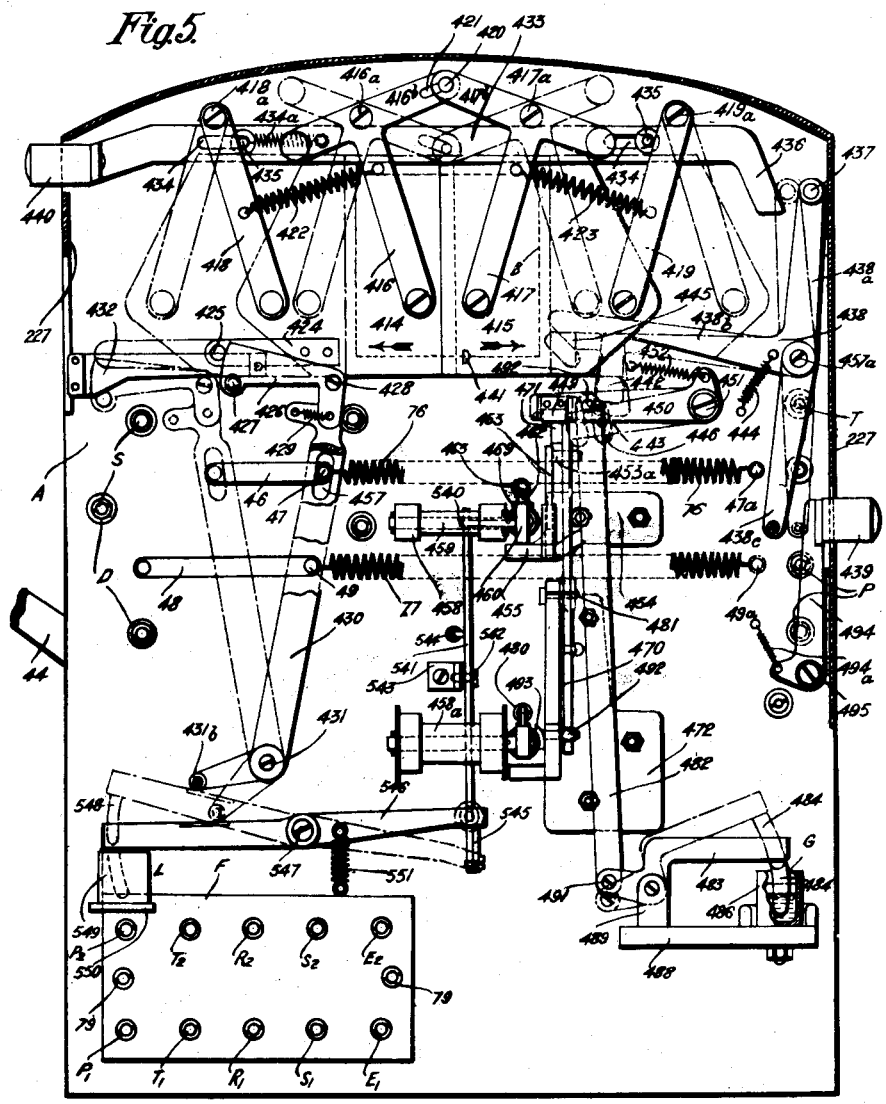

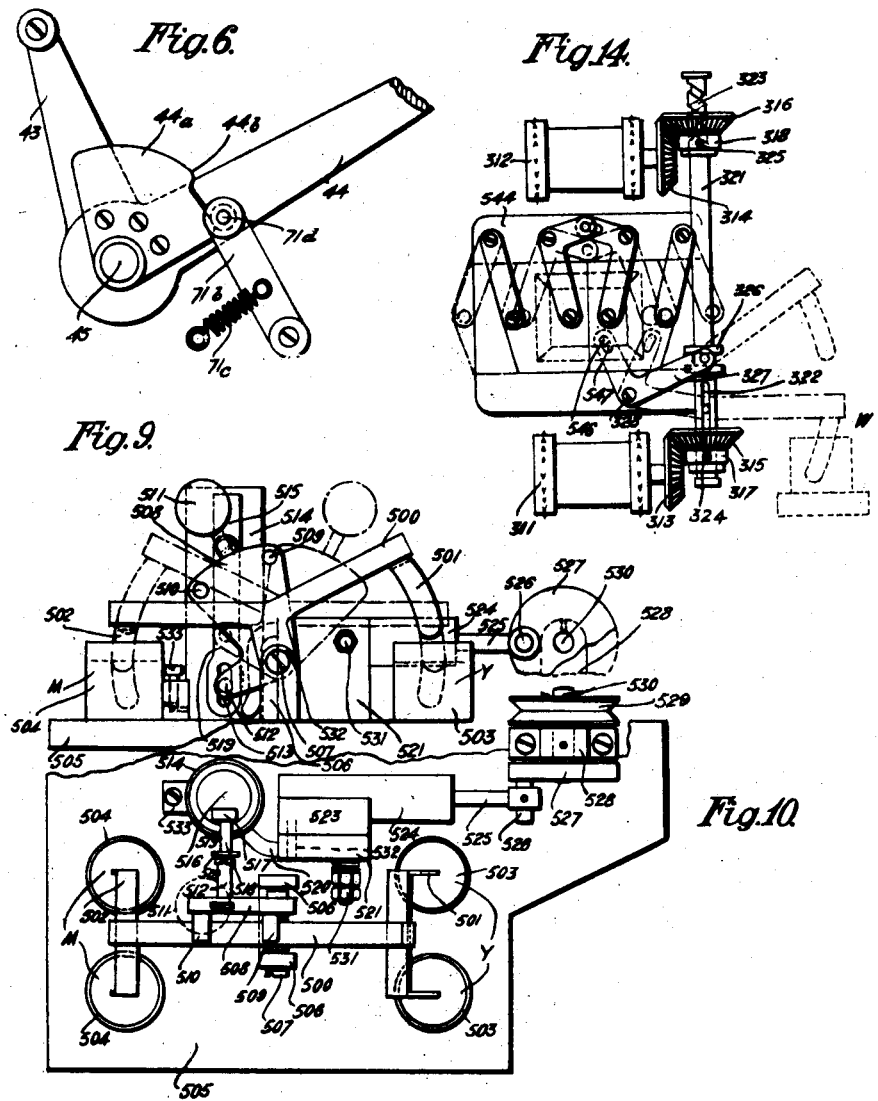

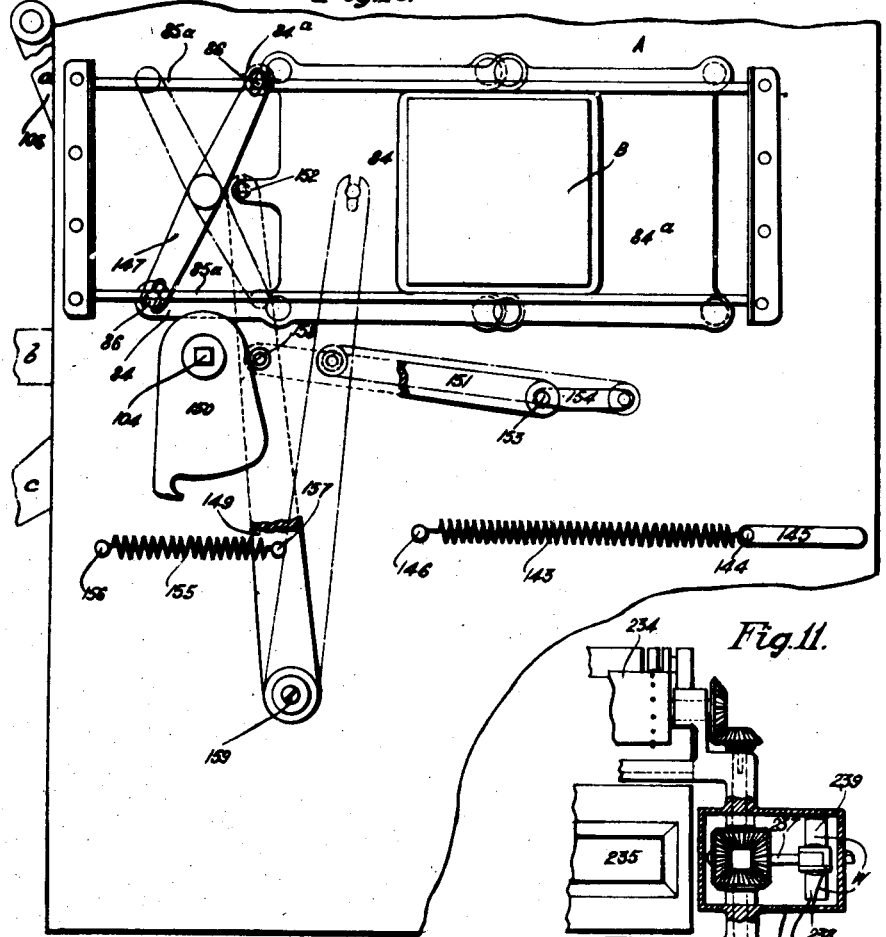

Dec. 19, 1922.

R. M. GEYER ET AL.
CINEMATOGRAPH SAFETY CONTROL APPARATUS.
FILED FEB. 25, 1921.

Inventors.
Roy Marcus Geyer.
William Herbert Tripp.
Per:-
Rayner &/o
Attorneys.

Dec. 19, 1922.
R. M. GEYER ET AL.
CINEMATOGRAPH SAFETY CONTROL APPARATUS.
FILED FEB. 25, 1921.
1,439,091.
13 SHEETS—SHEET 9.
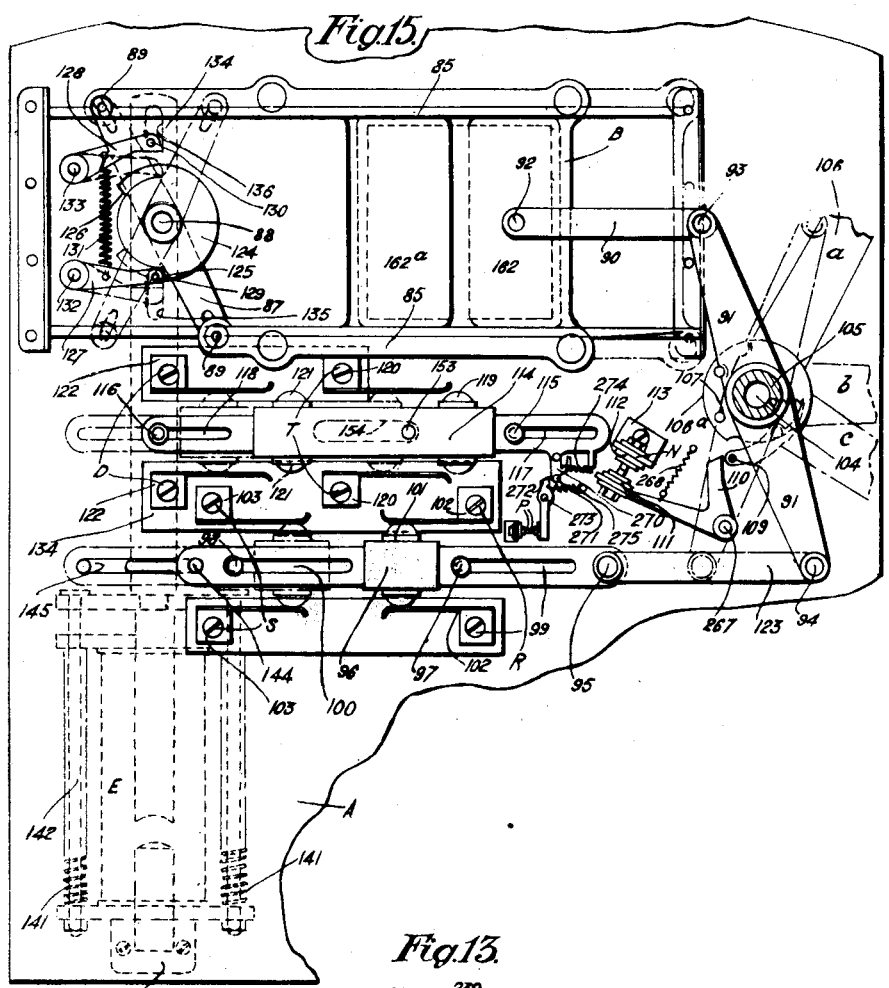
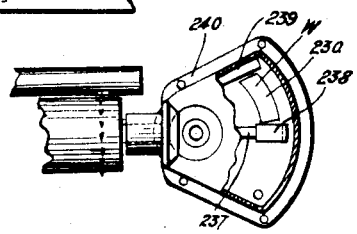
*Inventors.*
*Roy Marcus Geyer.*
*William Herbert Tripp.*
Per:-
*Rayner & Co.*
*Attorneys.*

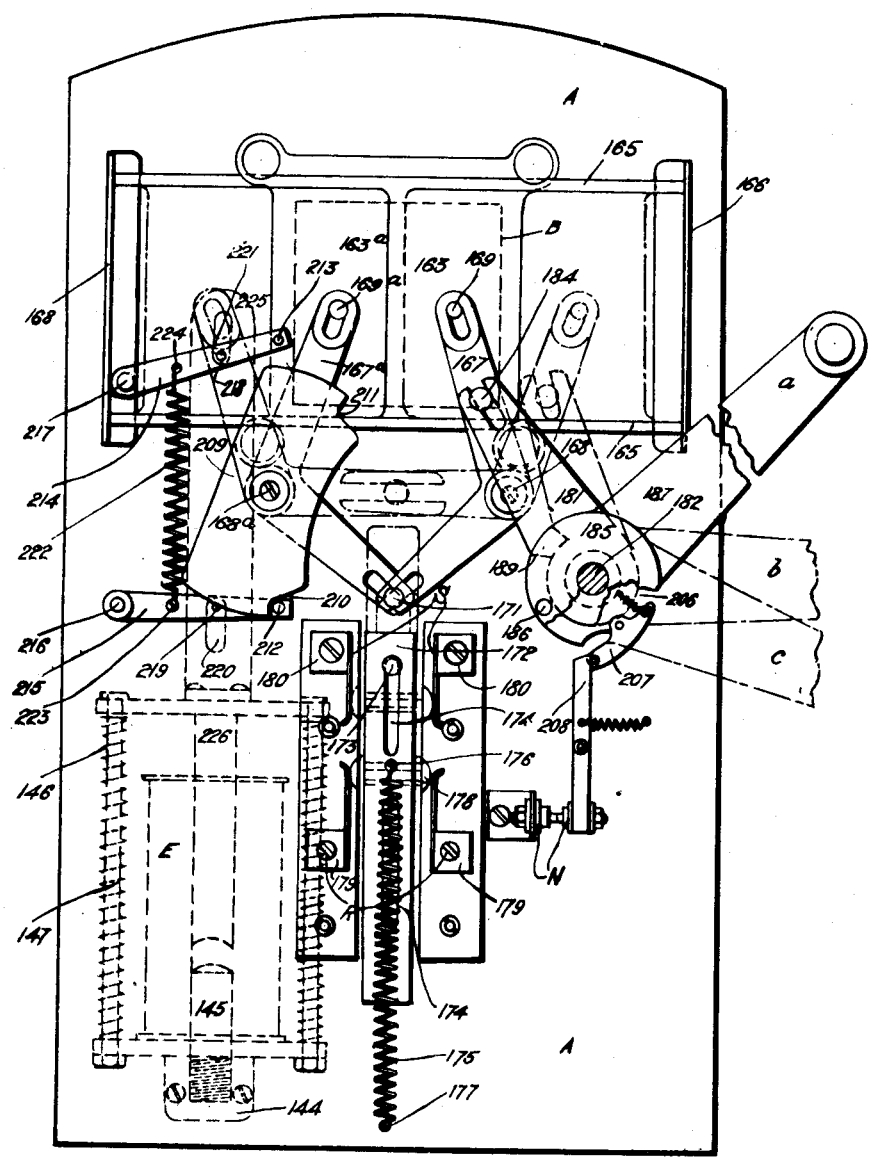

Inventors.
Roy Marcus Geyer.
William Herbert Tripp.
Per:-
Attorneys.

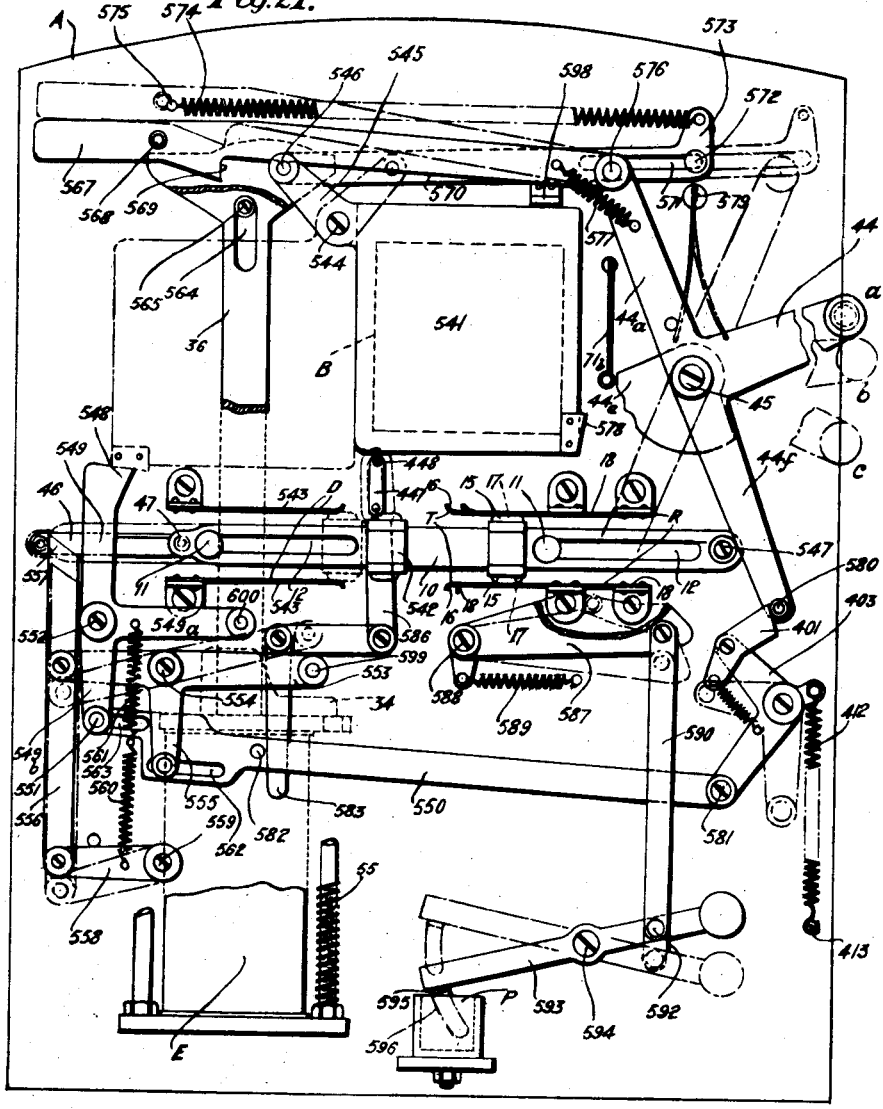

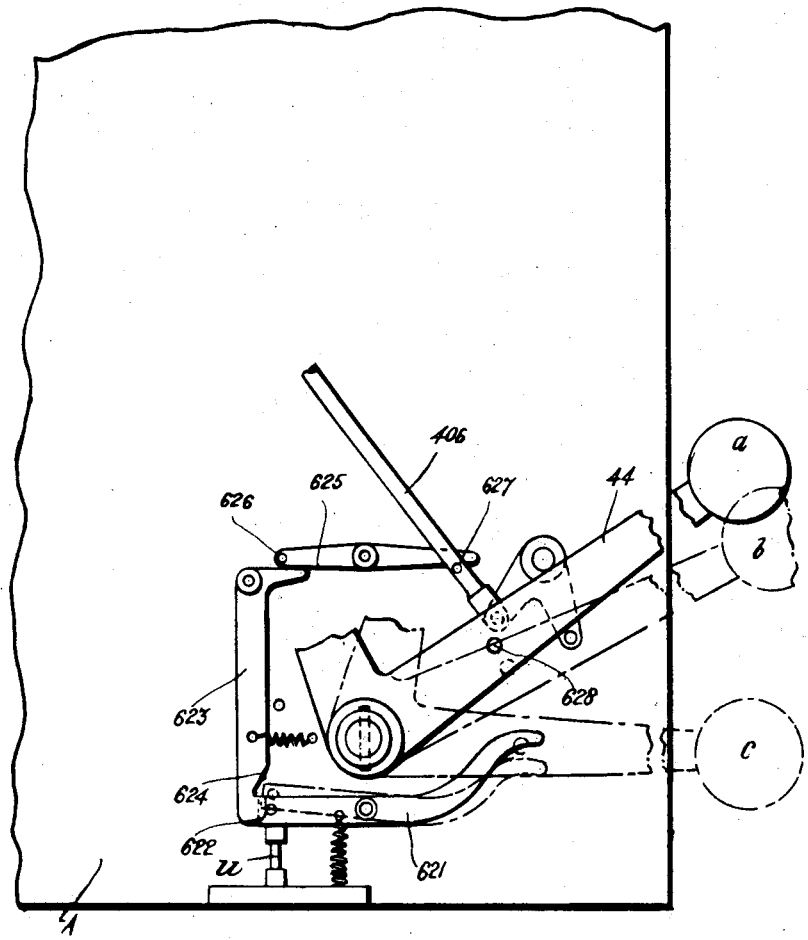

Patented Dec. 19, 1922.

1,439,091

UNITED STATES PATENT OFFICE.

ROY MARCUS GEYER, OF MUSSOORIE, AND WILLIAM HERBERT TRIPP, OF ROORKEE, INDIA.

CINEMATOGRAPH SAFETY CONTROL APPARATUS.

Application filed February 25, 1921. Serial No. 447,829.

*To all whom it may concern:*

Be it known that we, ROY MARCUS GEYER, subject of the King of Great Britain and Ireland, residing at The Picture Palace, Mussoorie, India, and WILLIAM HERBERT TRIPP, subject of the King of Great Britain and Ireland, residing at Thomason Engineering College, Roorkee, India, have invented certain new and useful Improvements in Cinematograph Safety Control Apparatus, of which the following is a specification.

This invention relates to automatic safety control apparatus for cinematograph and the like machines of the general class having a safety shutter disposed between the light and the film which shutter is normally closed and can only be opened by the operator when the machine has reached a safe speed, the safety shutter closing again automatically when the film becomes stationary from any of the causes mentioned in Patent No. 1,384,947.

The invention constitutes various improvements and modifications in and additions to the apparatus of the kind described in the above Patent No. 1,384,947. The principal objects of our invention may be summarized as follows:—

A modified form of safety shutter, the arrangement being such, that it will close upon the de-energizing of the solenoid irrespective of the position of the operating lever, and owing to this feature, there is no necessity for an intermediate shutter to close before the safety shutter can be opened.

We substitute in lieu of the intermediate shutter, what we call an auxiliary shutter, the operation of which is subsidiary to the safety shutter. It affords additional factors of safety, as it is so arranged that it can close automatically, independently of the safety shutter.

We provide means by which both the safety and auxiliary shutters may be closed manually when desired, and means by which the auxiliary shutter may be closed manually independently of the safety shutter, but cannot be opened independently of the safety shutter.

We provide a small safety shutter fixed in front of the gate of projecting machine and mechanically operated by means to be described.

Means to so electrically interconnect two projecting machines as to enable them to be worked alternately in continuous shows, so that the hall lights are not switched on between spools unless so desired, to enable an uninterrupted performance to be given, in such a manner that when one machine is projecting, the second machine can be threaded in readiness to start as soon as the film on the first machine comes to an end.

Alternative modified arrangements of the safety and intermediate shutters, and modified arrangements in the mechanism for operating the switches, as described in the above specification.

Other objects of our invention will be apparent from the following description.

The accompanying drawings illustrate by way of example the means we employ of carrying our invention into practice.

Fig. 1 is a diagrammatical view in side elevation, showing a projecting machine fitted with our invention.

Fig. 3 is a perspective view of the plunger extension shown in Fig. 2.

Fig. 4 shows a modification of the plunger extension shown in Fig. 3.

Fig. 5 is a view looking in a direction opposite to the arrow in Fig. 1, showing the auxiliary shutter and its controlling mechanism; switches G and L and its duplicate operating mechanism; the terminal board, etc.

Fig. 6 shows a modified form of the tractor bar locking device shown in Fig. 2.

Fig. 7 is a side elevation of the duplicate operating mechanism of switches G and L.

Fig. 8 is a fragmentary perspective view of the mechanism shown in Fig. 7.

Fig. 9 is a side elevation of the pneumatically operated governor switch.

Fig. 10 is a plan view corresponding with Figure 9.

Fig. 11 is a view looking in the direction of the arrow in Fig. 1, showing the differential gear for operating switch W.

Fig. 13 is a plan view of switch W, corresponding with Figure 11.

Fig. 14 is a view looking in the direction of the arrow in Fig. 1, showing an alternative or modified arrangement of operating either switch W, a small safety shutter fixed to gate, or both the shutter and switch W together.

Fig. 15 is a view looking in the direction of the arrow in Fig. 1, showing an alternative or modified arrangement of the safety shutter and controlling mechanism.

Fig. 16 is a view looking in a direction opposite to the arrow in Fig. 1, showing an alternative or modified arrangement of the intermediate shutter and controlling mechanism.

Fig. 18 is a view looking in the direction of the arrow in Fig. 1, showing another alternative or modified arrangement of the safety shutter and controlling mechanism.

Fig. 19 is a view looking in a direction opposite to the arrow in Fig. 1, showing another alternative or modified arrangement of the intermediate shutter and controlling mechanism.

Fig. 21 shows the invention applied to a pivoted safety shutter. In this form an intermediate shutter is not necessary.

Fig. 23 shows a modification for controlling the hall lights manually.

Figure 2:
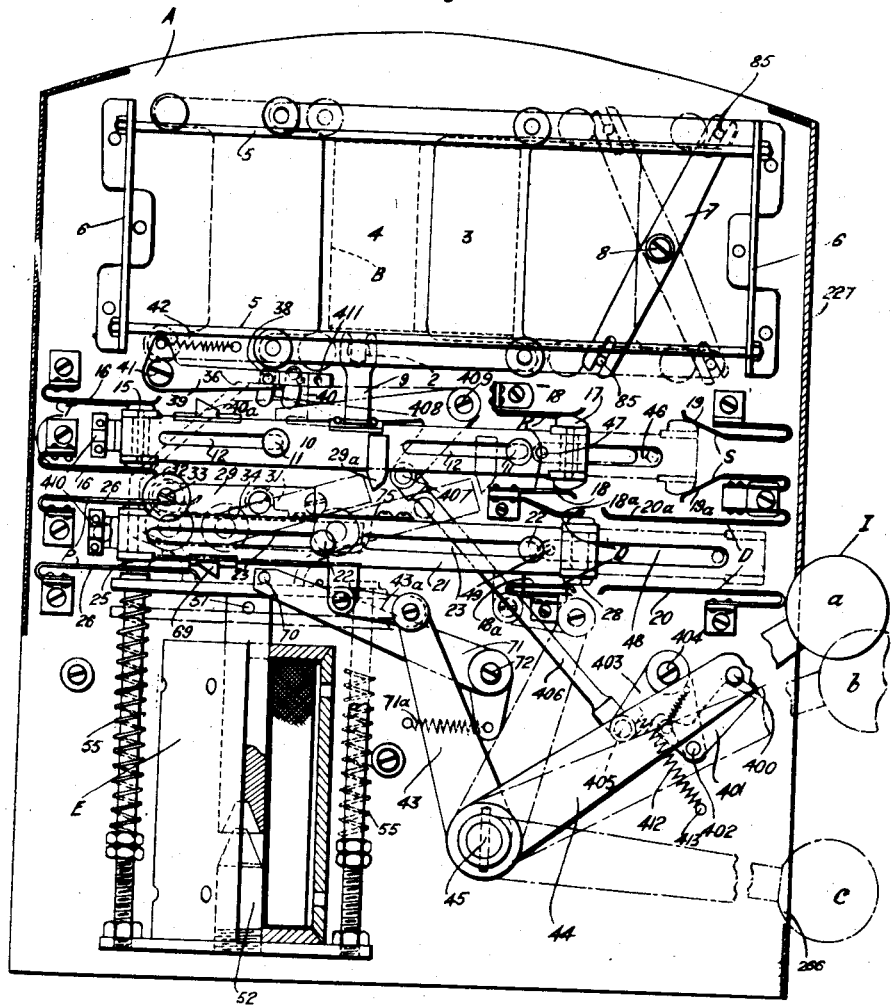
Fig. 2 is a view looking in the direction of the arrow on Fig. 1, showing the safety shutter and its controlling mechanism, etc. In this arrangement an auxiliary shutter is provided.

Some of the parts in the above figures are omitted for the sake of clearness; and alternate positions are shown where necessary, in dot and dash lines; and some of the parts are shown in dotted lines so that other parts may be clearly seen. Parts which perform similar functions and are common to all the arrangements illustrated in the above drawings, have the same reference numerals or letters. This is for convenience when describing the electrical connections and operations of any of these arrangements.

We will now describe the arrangement in which we dispense with the intermediate shutter of the type described and shown in Patent No. 1,384,947.

We may first with advantage describe the arrangement of the safety shutter, as shown in Fig. 2.

The shutter is contained within a casing comprising a supporting plate A, having an aperture B, and covers 227 having similar apertures C. These apertures are in the path of the rays of light from the lamphouse. The aperture B is normally closed by a safety shutter comprising two sliding members or leaves 3, 4. In order to lessen friction and prevent jamming we provide each sliding member with four rollers which are grooved to run on two pairs of supporting and guiding rods 5, 5, which are supported by brackets 6, 6, fixed to plate A. The sliding members 3, 4, are connected by a lever 7, pivoted at its centre to a stud 8 fixed to plate A. The outer ends of this lever are slotted to engage with studs 85, 85, which are fixed to extensions of the sliding members. Rotative movement of lever 7 will move the shutter leaves in opposite directions, thus opening or covering the aperture B. This motion is reversible, movement given to one of the leaves will rotate the lever 7. Movement is communicated to lever 7 by a crutch or lug 9 engaging a stud 2 fixed to sliding member 3. The crutch 9 is fixed to a bar 10, hereinafter referred to as the shutter bar, which is slidably mounted by means of studs 11, 11, preferably roller encased, and fixed to plate A. The studs engage in slots 12, 12, in the shutter bar 10, which is of uniform tubular section. This bar is provided with double-ended insulated plugs or studs 15 and 17. In some of the figures the sliding shutter bar is of solid section, with enlarged portions to carry the insulated plugs. In the normal position of the shutter bar 10 shown in full lines in Fig. 2, plug 15 is engaged with insulated contact plates 16, 16, forming a switch hereinafter referred to as the economizing switch (T); similarly plug 17 is engaged with insulated contact plates 18, 18, forming a switch hereinafter referred to as the hall-light switch (R). When the shutter bar 10 is moved to the position shown in dot and dash lines, plug 15 disengages from plates 16, 16, whereby switch (T), is opened; plug 17 disengages from plates 18, 18, whereby switch (R) is opened, and engages with plates 19, 19ª, forming a switch, hereinafter referred to as the projector motor switch (S). It will be seen that the movement of shutter bar 10 thus operates to open switches (T) and (R), and to close switch (S), as well as open the safety shutter.

A similar slidably mounted bar 21, is placed parallel to and below the shutter bar 10, and similarly carries two insulated plugs 25 and 28 respectively. Studs 22, 22, fixed to plate A, engage in slots 23, 23, in the bar 21, hereinafter referred to as the tractor bar 21. In the normal position of the tractor bar as shown in full lines, plug 25 is engaged with insulated contact plates 26, 26, forming a switch (P) in the solenoid circuit of a second machine, whilst plug 28 carried by tractor bar is disengaged from insulated contact plates 20 and 20ª, which are connected in parallel with the projector motor switch (S). Parts 28, 20 and 20ª, constitute a switch, hereinafter referred to as the projector motor starting switch (D). When the tractor bar 21 is moved to the position shown in dot and dash lines, switch (P) is opened and switch (D) is closed. The normal positions of the shutter bar 10 and the tractor bar 21 are as shown in full lines, with the shutter closing the aperture B. Sliding movement of the bars 10 and 21 acts against the tension of the springs 76, 77, on the back of the plate A. These springs are connected to the bars by studs 47 and 49, which are fixed to the bars, and project through slots 46 and 48 respectively, in plate A. The other ends of the springs are held by studs 47ª and 49ª respectively, fixed to plate A.

The movement of the tractor bar 21 is communicated by a lever pivotally mounted on stud 45, one arm 44 of the lever projecting through a slot 266 in the cover or casing 227, and being provided with a convenient transverse or other shaped handle I. This arm is hereinafter referred to as the operating lever 44, the other arm 43 being suitably connected to the tractor bar 21, preferably by means of a link 43ª, pivotally fixed to the tractor bar 21 and lever arm 43, thus converting the circular movement of the end of the arm into linear movement of the tractor bar.

Normally there is no mechanical connection between the shutter and tractor bars, but connection can be made by means of a pawl lever 29 pivoted on the tractor bar 21 being made to engage a detent 29ª suitably fixed to the shutter bar 10. Pawl lever 29 is pivoted to a lug 31 fixed to the tractor bar. This connection can only take place when the projecting machine has reached a certain predetermined speed and a governor on the machine closes the solenoid switch indicated at Y, Fig. 1. A solenoid E, which may preferably be of the ironclad type, being energized, the pawl lever 29 is free to engage with the detent 29ª by the action of a suitable spring 75. The shutter bar 10 will then move with the tractor bar 21, on the operating lever being moved down.

To determine the action of the pawl lever 29, its lower end is provided with a stud 33 carrying a roller 32 which rests on a rod or rail 34 forming part of an extension of the solenoid plunger 51. This extension is shown in perspective in Fig. 3, and may be of any suitable form. The plunger 51 works in the solenoid E, and forms the core of the same, being drawn in on energization of the solenoid, and projected by the action of springs 55, 55, (to limit allowed by the adjustable side guiding rods) when the solenoid is de-energized. Rod or rail 34 is of such a length as to engage the roller 32 in any position of the tractor bar, thus permitting of the disengagement of the shutter bar from the tractor bar, should the solenoid become de-energized, the rod or rail 34 pushing up the roller end of the pawl lever 29, the pawl end thus coming away clear from the detent 29ª.

The tractor bar is allowed a greater amount of movement than the shutter bar 10, the difference being utilized to close the projector motor starting switch (D), and then on the solenoid E becoming energized by the closing of the governor switch Y, rod or rail 34 comes away from the roller end of pawl lever 29, the other end of which is then pushed up by the spring 75 and is then in a position to engage with the detent 29ª; further movement of the tractor bar will now carry the shutter bar 10 into the position shown by dot and dash lines, and thus open the shutter.

On the shutter bar being moved to the end of its travel, another spring controlled pawl lever 39, (one end of which is pivoted to plate A by stud 41, the other end being provided with a tooth 40) will engage a detent 40ª, projecting from the shutter bar 10, and thus retain the shutter in the open position, against the tension of spring 76. The tractor bar and the operating lever can now be returned to their normal position, as shown in full lines. In the position b of the operating lever, the tractor bar has moved sufficiently to close the projector motor starting switch D, further movement being prevented by a locking bar or lever 71, pivotally fixed to plate A by stud 72.

Should the solenoid become de-energized while the shutter is locked in its open position by pawl lever 39, a projection 36ª, forming a part of the plunger extension 36 will come into engagement with a projecting pin 38 fixed to the pawl lever 39, and thereby lift the latter, against the tension of spring 42, out of engagement with detent 40ª; shutter bar 10 will then move immediately to the position shown in full lines by the action of spring 76, thus closing the shutter, and at the same time closing the hall light switch R and the economizing switch T, the projecting motor switch S being opened, thereby stopping the machine. It will be observed that if the solenoid is de-energized, the shutter will close automatically, irrespective of the position at which the operating lever may be.

To prevent the application by the operator of excessive force on the operating lever 44, and possible straining of the mechanism, a form of non-prohibitive stop is shown in Fig. 6 as an alternative to use of locking bar 71. A sector shaped cam plate 44ª is rigidly fixed to operating lever 44 as shown, with the edge of cam engaging a roller encased pin 71ᵈ fixed at the end of a pivoted lever 71ᵇ. This lever pin is pressed against the cam plate by the action of a stiff spring 71ᶜ. The arrangement is such that on the operating lever being moved from the $a$ to the $b$ position, the raised cam 44ᵇ will engage roller pin 71ᵈ and require an enhanced force to be expended to lift the pin to the upper part of the plate on the movement of operating lever from position $b$ to $c$. There is thus a distinctly perceptible check at the end of the first movement of the operating lever. Continued movement will not allow of the shutter being opened unless the solenoid is energized, but if not energized, the operating lever has to be moved back until the solenoid is energized.

We will now describe the means provided to enable the operator to stop the machine at any time when desired, as for example if there are two subjects on one spool, and it is desired to stop after the first picture on this spool. The means provided to effect this action are as follows:—A transverse pin 400 is fixed to operating lever 44, which being moved down, pin 400 engages with a spring controlled trip lever 401 which is pivotally fixed by a stud 402 to a lever 403. This lever is pivoted by a stud 404 fixed to plate A and is under the control of a spring 412 suitably mounted with one end fixed to lever 403, and the other end to a stud 413 fixed to plate A. A second lever 408 is pivotally mounted on stud 409 fixed to plate A, the two levers 403, 408, being connected by a link 406, pivotally attached to the levers by studs 405, 407, respectively, the link passing behind tractor and shutter bars 21 and 10 respectively. A transverse projecting pin 411 is fixed to the back of the pawl lever 39 in a position to be engaged and lifted by the long arm of lever 408 rising on the initial movement of operating lever 44 to position $b$. The positioning of the parts as shown allows of pin 400 engaging trip lever 401 on the initial downward movement of operating lever 44, but trip lever 401 will not be disengaged until the solenoid is energized, and further movement of lever 44 is permitted by locking bar 71. Where a non-prohibitive stop is provided in lieu of locking bar, as previously described, trip lever 401 will not be disengaged until the roller pin 71ᵈ has been lifted to the upper portion of the cam plate 44ª. When the shutter is locked in its open position by pawl lever 39, movement of the operating lever 44 from $a$ to $b$ will result in the long arm of lever 408 lifting pawl lever 39 out of engagement with detent 40ª, allowing the movement of the shutter bar to close shutter and operate the switches as described. These operations are thus performed mechanically instead of electrically by the action of a switch N to be hereafter described, in connection with alternative forms of shutter, the mechanical action having the advantage that it is positive and direct, and it may be utilized for stopping in any of the forms of shutter hereinafter described.

Referring to Fig. 2, it will be seen that we provide buffers 410, 410, fixed to plate A at the ends of the shutter and tractor bars, the buffers being faced with leather or other suitable material so as to prevent undue shock to the shutter and tractor bars on return to their normal positions under the action of their respective controlling springs 76, 77.

An economizing switch T has been mentioned as provided upon shutter bar 10. This is for the purpose of economizing the current used for energization of the solenoid E. It is found that a heavier current is necessary to draw in the plunger 51, than is required to hold it, once the plunger has come into contact with the stop fixed to the lower end of the solenoid E, and when this has happened the operating current can be advantageously reduced, and the economizing switch serves this purpose. It is however necessary that this diminution of current must take place after the plunger and stop actually make contact. The reduction is advisably made as early as possible after the solenoid E has become fully energized, but with the economizing switch T as shown in Fig. 2, it might be possible that the operator would start the projecting machine and keep the operating lever in position $b$ and the shutter closed, thus keeping the full current flowing through the solenoid. Apart from any deleterious effect on the solenoid coil itself which may be caused by overheating, this would be wasteful. To obviate this possibility, an additional switch M is provided, and wired in series with switch T on shutter bar. Switch M is combined with the governor switch Y in such a manner that the closing of the latter opens switch M with a slight delay action, and it will be seen by reference to Figs. 9, 10, that the action is automatic. These figures show the governor pneumatically operated, but it will be understood that the centrifugal governor as shown in Patent No. 1,384,947 may be adapted for the purpose. Switch M may be used in lieu of switch T, but it is preferably used in conjunction with the latter, and wired in series with same.

We may here with advantage describe the combined governor switch Y and economizing switch M. Figs. 9 and 10 give the details as pneumatically operated, as an alternative to centrifugal operation. To allow of this we provide an air pump with either an oscillating cylinder 524, with an airtight but freely slidable piston connected to a crank disc 527 by crank pin 526; or we may provide a fixed cylinder with inlet and outlet valves. The oscillating type of cylinder is shown in the figures. The crank disc 527 is fixed to shaft 530, which revolves in a bearing 528, the shaft carrying a pulley or gear wheel 529, which may be driven by belting or gearing from any suitable revolving part of the projecting machine, and the whole of the governor and switch are preferably totally encased in a suitable casing. The cylinder 524 is pivotally attached to a support 521, (fixed to base 505), in which support ports are provided, the suction or inlet port 532 leading to atmosphere, and the exhaust or outlet port being connected by tube 520 to the bottom of a vertical cylinder 514. This cylinder is provided with an adjustable leak valve 533, and a heavy piston 516, the latter having an extension 517 with stud 518 to which is attached the end of a link 519. The other end of link is formed into a slot 513 engaging with a pin 512 projecting from a short arm of a counterweight sector 508. The sector is provided with projecting pins 509, 510, and is pivoted to a shaft 507 carried by a support 506, which is attached to base 505. Shaft 507 also carries a lever 500, which is provided with a metal bridge piece 501, which by the movement by lever 500 may be lowered into, or raised from a pair of insulated cups 503, 503, fixed to base 505. The bridge piece 501 and cups 503, 503, form a switch Y in the main or series solenoid circuit. A second bridge piece 502 with a pair of cups 504, 504, are provided at the other end of lever 500, forming a switch M for the purpose as previously described. The arrangement of the two switches Y and M is such that on switch Y being closed, switch M will be opened. The position of lever 500 is determined by that of the sector 508, which is moved by the action of piston 516. On the latter rising by the pressure of air pumped by the cylinder 524, the slotted end of link 519 will lift pin 512 and rotate sector 508. On the latter rising to the position in which its centre of gravity passes vertically over the point of support, (shaft 507), the counter-weight 511 will cause it to overbalance, and allow projecting pin 509 to lower the raised arm of lever 500 and insert bridge 501 into the pair of mercury cups 503, 503, thus closing switch Y. This action will also withdraw bridge 502 from mercury cups 504, 504, thereby opening switch M. It may be pointed out that the design allows of a quick break being obtained, with the advantage of lessening any sparking or arcing due to break. It is also arranged that the level of the mercury in the cups is such that during the movement of lever 500, both bridges are making contact at the same time, or contact is made at one pair of cups before the break takes place at the other. The weight of piston 516 is such that on its dropping through the air pressure lessening, due to the air leaking from leak valve faster than replaced by the pump, link 519 will push or lift sector 508 from the position shown in dot and dash lines, and move it over to the position shown in full lines in Figure 9, thereby breaking the solenoid circuit at Y, and closing switch M.

The auxiliary or intermediate shutter and its controlling mechanism shown in Fig. 5, will now be described. The shutter comprises two leaves or plate members 414, 415, pivotally suspended by levers 416, 418, and 417, 419, respectively, from studs 418$^a$, 416$^a$, 417$^a$, and 419$^a$, which are fixed to plate A as shown. Each leaf of shutter is supported by two levers, with the object of obtaining parallel movement in opening or closing over aperture B in plate A. The adjacent levers 416, 417, are angle levers, the short arms of which are arranged to engage by means of a projecting pin 420, at the end of one short arm engaging in a slot 421 cut in the end of the other short arm. It should be noted that studs 417$^a$, 419$^a$, are slightly longer than studs 418$^a$, 416$^a$, so as to allow of a slight over-lapping of the shutter leaves and suspending levers. The leaves are normally under the control of springs 422, 423, which are fixed by means of studs to suspending levers as shown, in such manner as to tend to keep the leaves covering the aperture B in plate A. The engagement between the short lever arms causes movement of one leaf or plate member to be transmitted to the other, but in an opposite direction, so that the shutter will open from, or close toward the centre.

The opening movement is given by means of a lever 430, pivotally fixed at its lower ends to plate A by means of stud 431. The upper part of this lever 430 is provided with a slot 457, engaging the end of stud 47 which is fixed to shutter bar 10, and passes through a slot 46 in the supporting plate A for the purpose of attaching spring 76. The end of the stud is provided with a roller encasement, and lever 430 is arranged to be quite clear of the tractor bar stud 49 and spring 77. The upper end of lever 430 is provided with a spring pawl lever 426, pivotally fixed by stud 428 and controlled by spring 429 suitably attached. The end of pawl lever 426 is normally in engagement with a projecting pin 425 at the end of an extension 424 to shutter leaf 414. The movement of lever 426 serves to move leaf 414 to the position shown by dot and dash lines, leaf 415 at the same time moving in the opposite direction. The pawl lever 426 is provided with a roller encased pin 427, projecting from the back of the pawl lever, this pin engaging the under edge of a cam plate 432 which is fixed to plate A. The pin 427 is kept pressed to the edge of cam plate 432 by the action of spring 429. The cam is shaped to draw spring pawl lever 426 downward out of engagement with pin 425, on the shutter being sufficiently opened, so as to release the shutter for automatic or manual closing, by means to be described. At a point in the movement of shutter leaves just before the release referred to above, a detent 441 projecting from the back of leaf 415, passes by the movement of the leaf, under, and into engagement with a tooth pawl 445 provided at the end of one arm 438[b] of a three armed lever 438, which is pivoted to plate A by means of a stud 457[a]. Lever 438 is controlled by a spring 444, or its equivalent, and a pin 443 which is fixed to the back of pawl lever 39, the pin passing through a slot 446 in plate A. An extension 442 of lever arm 438[b], rests upon the projecting end of pin 443, so that the latter on rising through pawl lever 39 being lifted as previously described, will lift tooth 445 out of engagement with detent 441 and allow of shutter closing under the action of springs 422, 423, at the same time as the safety shutter closes. From the above description it is seen that simultaneous opening and closing of both safety and auxiliary shutters is obtained.

Means are also provided to allow of the auxiliary shutter being closed independently of the safety shutter when desired, in such manner as to cut off the light from the screen while still allowing the machine to run off a length of film from a spool. These means comprise a flat bar 433, slidably mounted close to plate A by fixed studs 435, 435, passing through slots 434, 434, in flat bar 433, the studs being extended from their heads to form stops to limit the closing movement of the suspending levers 418, 419. To the extension of one stud 435 a spring 434[a] is anchored, the other end of the spring being attached to a stud fixed to the flat bar 433. To one end of the flat bar is fixed a push button 440, which projects through and beyond the casing 227, the other end of the bar being provided with a downward extension 436, to engage with a projecting roller encased pin 437, carried by arm 438[a] of lever 438. On button 440 being pushed inward and flat bar 433 sliding against the tension of spring 434[a], should the shutter be open with lever arm 438[a] in the position shown in dot and dash lines, the lever will be rotated on stud 457[a], thereby lifting pawl tooth 445 from retaining engagement with detent 441, and releasing auxiliary shutter only and allowing it to close, at the same time leaving the safety shutter open and the machine running. To allow of this operation being carried out from the opposite side of the machine, one end of arm 438[c] of lever 438 is provided with a roller encased pin which may be engaged by a lever 494 which is pivoted to plate A by stud 495, and controlled by a spring 494[a] suitably attached. A push button 439[a] is fixed to lever 494 and projects through casing 227. On pushing in this button, the lever engages with pin on end of lever arm 438[c] and rotates same, thereby releasing auxiliary shutter. To allow of easy adaptation of the apparatus to existing machines, a form of mechanism for operating in the event of torn, or defective, perforations causing stoppage of the film in the gate or in the case of the film parting or coming to an end, or failure to take up by the bottom spool will now be described. Referring to Figures 5, 7 and 8, a supporting bracket 454, having a projecting portion 455, supports a tube 469, slidably mounted by means of studs 464, 465, 466, 466, fixed to supporting bracket 455 and lugs 456, 456, respectively. The studs are provided with rollers, and studs 464, 465, are in the vertical plane, and studs 466, 466, in the horizontal plane. This is desirable to obtain freedom of sliding movement of tube 469 in the event of the force applied to the tube not being in an axial direction. Movement is transmitted to the tube 469 by a roller 458 engaging in the loop of film formed below the gate. Roller 458 is mounted on a spindle 459 fixed to a plug 460 secured in tube 469 by means of a set screw 461. On the loop tightening, due to defective perforations in the film causing the intermittent sprocket to fail to pull the film, the roller 458 and tube 469 are drawn forwards against the tension of a spring 463, which has one end secured to a projecting stud 462 fixed to tube 469, the other end of spring being anchored to an extension of fixed stud 464. A lug 453 is fixed to tube 469, and carries a projecting pin 453[a] in a position to engage a lever 470, on tube 469 being pulled forward. Lever 470 is controlled by a spring or counterweight, and pivoted by stud 481 to bracket 472, and one end is provided with a projecting tooth 471 to engage with a roller detent 449. This detent is fixed to a lever 450 pivoted by means of a stud 451 to plate A. To lever 450 is pivotally fixed a link 482 by means of stud 492, the other end of the link being similarly pivoted to a rocking lever 483 by a stud 491. The rocking lever 483 is pivotally fixed to a support 489 fixed to an insulated base 488 suitably attached to plate A. The rocking lever carries an insulated metal bridge piece 484, which by the movement of lever 483 may be raised from or lowered into a pair of mercury cups 486, 486, forming a switch G in the solenoid circuit.

On the loop of film below the gate tightening due to defective perforations, tube 469 will be drawn forward, thereby pulling tooth 471 of lever 470 from beneath roller detent 449, and allowing lever 450 and link 482 to drop by gravity or the action of a suitable spring 452. This action will open switch G, thereby de-energizing solenoid E, and allowing shutters to close and stopping machine.

A very similar mechanism to that described is arranged below, consisting of a (if desired both brackets 454, 472 could be made in one piece) strutted bracket 472 supporting a tube 493 slidably mounted on studs 474, 474, 476, 476$^a$, and controlled by a spring 480. A roller 458$^a$ is fixed to tube 493 so as to be engaged and held forward by the film between take up sprocket 262 and bottom spool, against the tension of spring 480. On the broken end of a film leaving the bottom sprocket, or in the event of slackness of film due to failure to take up, roller 458$^a$ will move back under the tension of spring 480. A roller encased pin 492$^a$ fixed to the tube 493 will engage the lower end of lever 470 and push it back, withdrawing tooth 471 from under roller detent 449, and allowing lever 450 to drop, and thereby open switch G, etc., as before described. Levers 450 and 483, after dropping are re-set to the positions shown in Figs. 5, 7 and 8, by means of the operating lever 44, the arrangement being such that lever 408 rising in the manner previously described lifts a transverse pin 448 fixed to the back of lever 450 and projecting through a slot in plate A, so as to be engaged by lever 408 on the latter rising.

It will be seen that the method described necessitates no structural alterations to an existing machine.

We will now describe mechanism for the operations described above, which while entailing structural alterations, are preferable, as being positive in action. Two forms are indicated, one being a differential gear action, and the other a differential screw mechanism, the latter being the preferable form. These designs have the advantage of being particularly applicable for incorporation in new machines.

Figure 12:
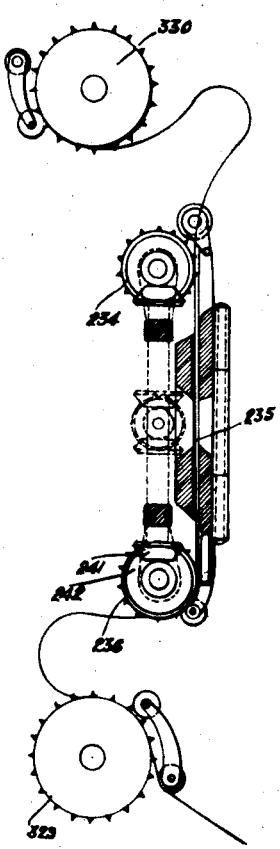
Fig. 12 is a side view corresponding with Figure 11.

Referring to Figs. 11, 12, 13, which show the switch W in the solenoid circuit, and the differential gear to operate it; a partly free sprocket 234, of similar size to the intermittent sprocket, is mounted above the gate 235, in such a manner that it is driven by the motion of the film. This sprocket is connected to the intermittent sprocket 236 by means of a differential gear, the projecting arbor 237 remaining stationary as long as the free and intermittent sprockets rotate at the same speed; but should the film break anywhere between these two sprockets, the partly free sprocket 234, which is driven by the film, will lose motion because the film at this part will remain stationary, and as the intermittent sprocket is still rotating, the arbor 237 will be moved by the differential gear, in a horizontal plane. This movement will break the solenoid circuit. The same action will take place in case the intermittent sprocket fails to pull down the film owing to defective perforations. Fig. 13 in which the cover 240 is partly broken away shows the arbor 237 to which is fixed an insulated plug 238 which with the insulated contact plates 239, form the switch W. The advantages we claim for this switch, lie in the fact that the operator is compelled to have it in its operative position, or condition when threading the film and if he omits to do this through inadvertence it will be impossible to open the shutter, as the solenoid circuit would be open at this place.

In some projecting machines, masking entails altering the distance between the gate and the intermittent sprocket, i. e., the distance between sprockets 234 and 236 will vary. To allow for this the outer bevel wheel 241 in mesh with the bevel wheel 242 fixed to the intermittent sprocket may be mounted on an extensible shaft, motion being conveyed to it by a pin 243 fixed to the collar or sleeve of the bevel 241, the shaft 245 having a slot or featherway 244 for the purpose. In the above method the length of the contact plates 239 should be such as to allow of the necessary play or repositioning of the arbor due to alterations in masking. It is preferable to arrange that the distance between the free and intermittent sprockets may remain constant, and this can be done by attaching both sprockets to the masking frame which carries the intermittent sprocket.

We will now describe an alternative or modified arrangement of operating switch W. In this method of construction we do not employ the differential gear of the form described above, thereby simplifying the mechanism. Referring to Fig. 14, it will be seen that the mechanism may be made to operate switch W, only; or a small safety shutter, or both switch W and the safety shutter together, the latter form being illustrated in Fig. 14. The apparatus is fitted to the gate and preferably to the same portion of the machine to which the intermittent sprocket is fixed for the reason detailed above. 311 is the intermittent sprocket and immediately above the gate we provide a sprocket 312 fitted in a suitable manner, having the same number of teeth as the intermittent sprocket. Sprocket 312 is film driven, similar to sprocket 234, Fig. 11. The spindles of both the sprockets are provided with bevel wheels 313 and 314, which gear into similar gear wheels 315 and 316 respectively. Bevel wheels 315 and 316 are supported by brackets 317 and 318, respectively, which are fixed to the gate mounting or to the rising and falling frame provided on some machines for the purpose of masking; these brackets engage with bosses integral with the bevel wheels 315 and 316. A vertical shaft or rod 321 passes through the boss of each wheel 315, 316, the shaft being splined at the lower end 322 which is in the boss of bevel wheel 315, and provided with a spiral groove or thread 323, at the upper end which passes through the boss of bevel wheel 316. The lower end of the groove or thread terminates in a circular groove to prevent overdriving. A pin 324, fixed in the boss of bevel wheel 315 engages the spline 322, the rotation of bevel wheel 315 thereby causing the shaft 321 to rotate, at the same time allowing the shaft to move freely in a longitudinal or axial direction up or down. A pin 325 which is fixed to the boss of the bevel wheel 316, engages the spiral groove 323. It will be seen that sliding or longitudinal movement only is permitted between shaft 321 and bevel wheel 315, while a combination of longitudinal and rotative movement can be given relatively between shaft 321 and bevel wheel 316. The shaft is provided with a grooved collar 326 which will allow of the rising and falling movement of shaft 321 being transmitted to an arm 327, pivoted at 328 to operate switch W.

The apparatus operates in the following manner:—

The film is threaded into the machine in the ordinary manner. After leaving the top spool, the perforations engage the teeth of sprocket 330, Fig. 12, then the free sprocket 312, then through the gate, then sprocket 311, then sprocket 329, Fig. 12, and from here to the bottom spool. Before threading, the film driven free sprocket 312 must be turned in a forward direction as far as it will go, to ensure that the shaft 321 is right down, and switch W thereby closed.

In Fig. 14, the shaft 321 is shown in the raised position, and the switch open. On the machine being started the positively driven intermittent sprocket 311 will pull the film downward and thus rotate the film driven sprocket 312 at the same speed. Bevel wheel 316 may be considered as acting as an ordinary nut screwed upon a bolt, the position of the latter being taken by the shaft 321 having the spiral groove 323. As the bevel wheel 316 and the shaft 321 rotate at the same speed, and in the same direction, there will be no relative motion between them, but should the bevel wheel 316 stop from any cause while the rotation of bevel wheel 315 and shaft 321 continues, it will be seen that the shaft 321 will run upward into the bevel wheel 316; thus lifting the switch arm 327, and opening switch W in the solenoid circuit. The stoppage of bevel wheel 316 may be caused by the film perforations being torn or defective, in which case the intermittent sprocket 311 will fail to pull down the film although it will continue to revolve, while the upper feed sprocket 330, Fig. 12, will continue to feed the film between itself and the film driven sprocket 312, and the film between sprockets 312 and 311, ceases to move. The stoppage of this portion of the film will cause bevel wheel 316 to stop, and thus bring about the action described above. It may be remarked that the time taken for the opening of switch W from the moment that the film becomes stationary in the gate, is determined by two factors, firstly by the rate of speed of the projecting machine, and secondly by the difference in size of bevel wheels 314, 316, and 313, 315. If the action is required to be quicker, then wheels 315, 316, should be smaller than wheels 313, 314.

The operation of the mechanism above may be made to mechanically close a small safety shutter fixed in front of the gate aperture, and this action may be in lieu of, or additional to the operation of switch W. Reference to Fig. 14, will show the mechanism for combining both operations. The shutter is preferably of the form of the auxiliary shutter previously described and illustrated herein, but with the closing springs 422, 423, omitted as being unnecessary. The pivots or studs of suspending levers are mounted upon a plate 544, fixed in front of gate, and supported by the movable frame provided for masking, and to which the intermittent and film driven sprockets are also fixed. The plate is provided with an aperture of sufficient size to allow of the gate being uncovered at any position of the masking frame, a similar provision being made in the height of the shutter leaves. As previously described, with this form of construction the movement of one leaf of the shutter causes the other to move simultaneously in the opposite direction. One leaf of the gate shutter is connected to shaft 321 by means of a lever 327 (pivoted to plate 544 by stud 328), engaging with grooved collar 326 in such a manner that the rising of shaft 321 closes the shutter and in the lower position of shaft the shutter is open, and retained in that position. In the event of film stoppage, due either to defective perforation, or to the film coming to an end, or to the film tearing below the gate, the shutter will close, and cut off the light rays from the aperture of gate.

The mechanism shown in Fig. 14 in conjunction with the automatic light cut off as at present fixed to every machine, will render the employment of the safety and auxiliary shutters quite unecessary. But if the automatic control of two machines electrically interconnected is desired, then it will be necessary to retain the safety shutter and its controlling mechanism as shown in Fig. 2, in this case switch W would be in lieu of switch G, Fig. 5, which with its operating gear would be quite unnecessary.

In our endeavour to provide improvement in the technique of projection, we find that it is not desirable for the hall lights to be restored in the case of stoppage due to defective perforations, as the defect can be remedied in a few seconds. Similarly, in the working of electrically interconnected machines, it is not desirable that the lights be momentarily restored in the case of slight delay in starting or obtaining speed on the second machine. To prevent this we provide by the addition of contact plates 18ª, 18ª, to be connected by plug 28 as shown in Fig. 2, an additional hall light switch Q, connected in series with switch R, and operated by the tractor bar in such a manner that this switch Q is opened by the movement of the operating lever from a to b. We also provide an additional switch L, in series with switches R and Q as shown in Figure 5. This switch comprises a pair of mercury cups 549, and a rocking lever 546, pivoted at 547, and controlled by a spring 551; the rocking lever carries an insulated metal bridge piece 548, which may be raised from, or lowered into the insulated mercury cups. When opened by means to be described, the switch is again closed, against the tension of spring 551 by a roller encased pin 431ᵇ carried by an extension of lever 430, engaging the raised rocking lever and lowering the bridge piece into the mercury cups. Switch L is normally kept closed by the engagement of one end of lever 546 with a spring pawl or detent 545 which is pivotally fixed to the end of a lever 541. Lever 541 is pivoted at 542 to a supporting bracket 543 and is controlled by a spring 544 suitably attached. The upper end of lever 541 is in position to be engaged by a projecting pin 540, fixed to tube 469 in such a manner as to cause lever 541 to release rocking lever 546, when tube 469 is drawn forward by loop tightening. The effect is such that on a stoppage due only to defective perforations, the hall light circuit is broken at L, thereby preventing the restoration of lights. On restarting after rectification of defect, switch L is not again closed until the safety shutter opens, and the circuit is also broken at R.

We will now describe a modification in the form of safety shutter which will allow of the form of pivoted shutter as shown in Patent No. 1,384,947, being used either with or without an auxiliary shutter as previously described. In the form shown in the above Patent No. 1,384,947, an intermediate shutter is provided, but in the form to be described and shown in Fig. 21, of accompanying drawings the intermediate shutter is not required or necessary. The technique resulting from the use of this form is the same as that from the form of safety shutter first described herein (Fig. 2).

A shutter 541 is pivoted by a fixed stud 544 to plate A, so as to cover the aperture B in the normal position as shown in full lines in Fig. 21. It is normally kept closed by the action of a spring 574 connected to the shutter by means of a link 570 which is pivotally attached to a pin 546 fixed to a lever extension 545 of shutter. A buffer 598 faced with suitable material is arranged to limit the closing movement of shutter 541. Link 570 is pivoted at one end to pin 546, the other end being slotted to allow of sliding movement by means of a fixed stud 572 engaging in the slot 571, the spring 574 being attached to link extension 573 and stud 575 fixed to plate A. Movement to open the shutter is obtained by means of a hooked tractor lever 567 pivoted at one end to arm 44ª of a three-armed operating lever 44, and controlled by a spring 577 tending to keep lever 567 in a position to allow of hook 569 engaging with pin 546, when hook lever 567 is suitably moved by the operating lever 44. Means are provided to determine the engagement of hook 569 with pin 546, and consist of an extension 36 of the plunger of a solenoid as previously described. The upper part of the extension is widened roughly to T form so as to engage with a roller encased pin 568 fixed to hook lever 567, at any position of the latter, the engaging edge or surface of the extension being shaped to conform to the movement of pin 568 in its motion under the control of operating lever 44 and pin 546. A slot 564 engaging with a roller-encased stud 565 serves to support and steady the upper end of solenoid extension 36. It will be seen that pin 546 serves to pivot link 570 as well as to be engaged by hook lever 567, on the latter being lowered by the energization of the solenoid. On the latter being de-energized the extension 36 lifts pin 568 and hook lever 567 to the position shown by dot and dash lines thereby disengaging hook 569 from pin 546, thus closing the shutter. The shutter is therefore releasable at any position of the operating lever 44, and there is thus no necessity to provide an intermediate shutter as described in Patent No. 1,384,947.

To allow of the necessary switching operations being carried out, a shutter bar 10 is provided, and slidably mounted as shown by fixed roller-encased pins or studs 11, 11, engaging with slots 12, 12, in the bar. This bar is provided with double-ended insulated plugs or studs 542, 15 and 17, the latter being placed side by side. In the normal position of the shutter bar 10, as shown in full lines, plug 15 is engaged with insulated contact plates 16, 16, forming economizing switch T in the solenoid circuit; similarly plug 17 is engaged with insulated contact plates 18, 18, forming switch R in the hall light circuit. When the shutter bar 10 is moved to the position shown by dot and dash lines plugs 15 and 17 disengage from plates 16, 16, 18, 18, whereby switches T and R are opened.

In the normal position of the shutter bar 10, plug 542 is disengaged from insulated contact plates 543, 543, but on movement of bar, engagement ensues, closing switch D in the projector motor circuit. It will be noted that this switch D combines the functions of both switches D and S as shown in Fig. 2. Sliding movement of bar 10 is communicated by arm 44$^f$ of operating lever 44 engaging with a roller-encased pin or stud 547 is fixed to the shutter bar 10, and the movement acts against the tension of a spring 76 placed at the back of plate A. This spring is connected to the shutter bar by a stud 47 projecting from the back of the bar 10, through a slot 46 cut in plate A, the other end of the spring being held by a stud fixed to the back of the supporting plate. The engagement of arm 44$^f$ with the stud 547 converts the circular movement of operating lever 44 into linear movement of the shutter bar 10.

When the shutter bar is moved by the action of operating lever 44 into the position shown by dot and dash lines it is retained by a detent 557 engaging the roller encased front end of stud 47, the detent being formed at the end of a bar pivotally mounted by linkage to allow of parallel movement vertically under the control of a spring 560 suitably attached. The detent 557 may be depressed by the movement of the shutter bar causing stud 47 to ride over the inclined top of the detent; it is also depressed by the lifting of pin 599 fixed to the end of lever 553 engaging with a part of plunger extension 36 of solenoid E on the latter becoming de-energized. It may also be depressed by the action of trip mechanism to be described. Should depression of the detent take place whilst the shutter bar is retained in the position shown in dot and dash lines, the shutter bar will move back under the tension of spring 76, to the extent allowed by the slots 12, 12, and the operating lever arm 44$^f$.

The closing of the shutter 541 is entirely independent of the shutter bar, and provision is made to allow of its being closed by means of the operating lever whilst still allowing the shutter bar to keep switch D closed and thus run off a length of film whilst keeping the screen dark etc. The mechanism for retaining the shutter in the open position after opening same by the means described consists of a spring controlled three-armed lever 549 provided with a detent 548 in a position to engage with a stop 578 fixed to shutter. Lever 549 is kept normally in the position shown in full lines by the action of a spring 561 suitably attached. An arm 549$^a$ of lever 549 is provided with a projecting pin 600 to be engaged by the part 34 of solenoid plunger extension 36, on the solenoid becoming de-energized, thereby rotating pivoted lever 549, and withdrawing the supporting detent 548 and allowing shutter 541 to close.

In addition to being controlled by solenoid action, detents 548 and 557 can be operated by means of a trip stopping mechanism as previously described, the connection being by means of a slotted link 550 from lever 403. The slots are provided to allow of the release of shutter and shutter bar being successively operated. The trip mechanism is operated by means of a roller-encased pin 580, fixed to arm 44$^f$ of operating lever engaging the spring controlled trip 401 fixed to lever 403 to one arm of which link 550 is connected pivotally. As previously described a non-prohibitive stop cam plate 44$^e$ is fixed to the operating lever 44, having depressions into which a spring controlled roller-encased pin 71$^b$ can perceptively move, the positions of the depressions being such that the first indicates the point at which the shutter only is released for closing, whilst movement of lever 44 to the second position will allow of the shutter bar being also released, thereby stopping the machine.

To allow of the "setting" of switch G as previously described with reference to Fig. 2, the pin 448 which is fixed to lever 450 and projects through a slot 447 in plate A, is lifted by means of a slotted link 586 connected to a pivoted lever 583. This lever is in a position to be engaged by a projecting pin 582 fixed to the back of link 550 in such a manner that the movement of the link by the operating lever 44 through the trip mechanism causes link 586 to lift pin 448 into a position for lever 450 fixed on back of plate A to be retained as previously described, with reference to Fig. 5.

To permit of operation when two electrically interconnected machines are used, the movement of the operating lever 44 is utilized to open a switch P, connected to the solenoid circuit of the second machine. The mechanism for the purpose comprises a cam-edged lever 587, pivoted at 588 to plate A, controlled by a spring 589 suitably attached, and connected to the switch lever 593 by a link 590. The cam lever may be positioned to be engaged by the roller encased pin 580, either after or concurrently with the engagement of the pin 580 and the trip 401. On the pin 580 engaging the inclined end of cam lever 587, the latter is at first pushed downward, thereby withdrawing the insulated metal bridge piece 595 from the pair of mercury cups 596 forming switch P. The edge is shaped in such a manner that after the cam lever is moved down sufficiently to open switch, the pin 580 moves along the edge of the cam which is then concentric with the centre of stud 45 on which the lever arm 44¹ rotates.

Figure 17:
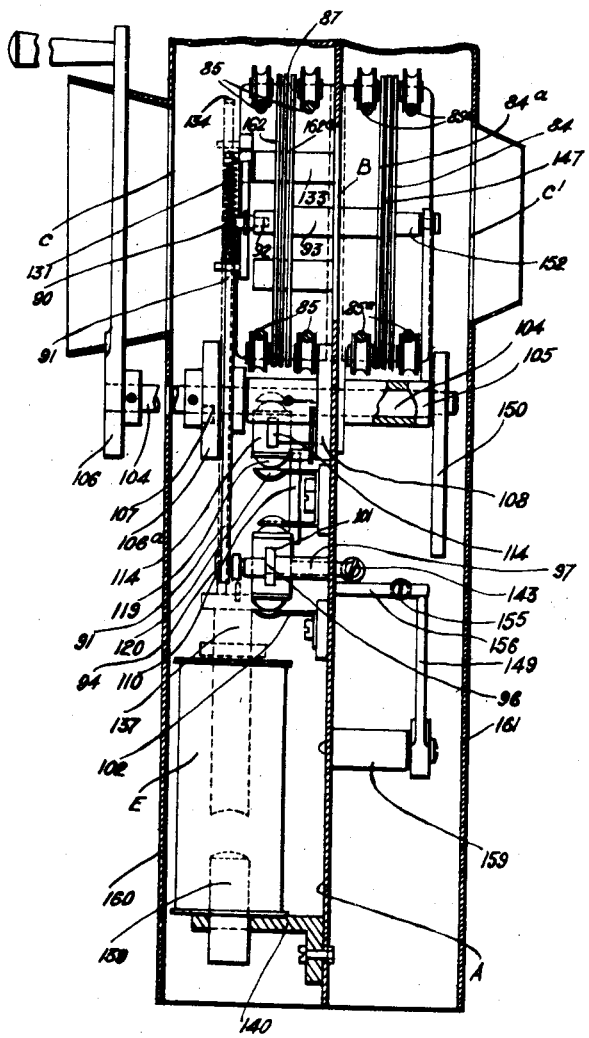
Fig. 17 is a side view of the mechanism shown in Figs. 15 and 16.

We will now describe another alternative or modified arrangement of the safety and intermediate shutters described in Patent No. 1,384,947. Referring particularly to Figs. 15, 16, and 17, it will be seen that two shutters are provided, one on each side of a supporting plate which we shall refer to as plate (A). In the normal position the sliding members or leaves 162, 162ª, hereinafter referred to as the safety shutter closes the aperture B whilst the sliding members or leaves 84, 84ª, hereinafter referred to as the intermediate shutter, remain open. These shutters are constructed in a similar manner to that of the safety shutter in the arrangement previously described, (Fig. 2).

The sliding members 162, 162ª, are connected by a lever 87 pivoted at its centre to a stud 88 fixed to plate A. The outer ends of this lever are slotted to engage with studs 89, which are fixed to extensions of the sliding members. Rotative movement of lever 87 will move the shutter leaves in opposite directions, thus opening or covering the aperture B. This motion is reversible, movement given to one of the leaves will rotate the lever 87, and such movement is given by a link 90, attached at one end to a stud 92 fixed to leaf 162, the other end being pivoted by stud 93 to a lever 91 which is pivoted at its centre to a transverse shaft 104. This shaft passes through plate A and revolves in a sleeve 105 fixed to same, the rotation of the shaft being driven manually by means of a lever 106, hereinafter termed the operating lever, which is rigidly fixed to the shaft 104 where it projects outside the casing 160.

With the safety shutter in the normal closed position, and the operating lever in its normal position (a), the lever 91 is free upon shaft 104. A fixed collar 106ª on the latter is provided with a projecting pin 107 which on the rotation of shaft 104 by means of operating lever 106 engages lever 91 when the lever 106 has reached position (b). The further rotation of lever 91 will then cause the safety shutter to open, becoming fully opened when the operating lever 106 is at position (c). The lower end of lever 91 is connected by means of a link 123, pivotally attached to a slidable member or bar 96, hereinafter referred to as the shutter bar. This bar slides upon fixed studs 97, 98 which pass through slots 99, 100 respectively in the bar. The central portion of the bar 96 carries an insulated contact piece or stud 101, which connects either of two pairs of insulated contact plates 102, 102 or 103, 103. In the normal position of the bar as shown in full lines, contact plates 102, 102, are connected, and form the hall light switch R the plates 102, 102, being connected in the hall light circuit. The other pair of contact plates 103, 103 are connected when the bar 96 is moved to the position shown in dot and dash lines, and form the main motor switch S—the plates 103, 103, being connected in the projector motor circuit. Shutter bar 96 is provided with a spring 143 which is fixed at one end to a stud 146 which is fixed to plate A and at the other end to a pin 144 fixed to the bar 96 and passing through a slot 145 in the plate A. The spring tension will bring the sliding bar and safety shutter to their normal position shown in full lines, when the open shutter is released by the unlocking mechanism in the manner hereinafter described.

A slidably mounted bar 114 is placed between bar 96 and the safety shutter, and parallel to them. This bar is similar to bar 96, and is mounted by fixed studs 115 and 116 which engage in slots 117 and 118 respectively. The bar 114 carries two insulated studs or contact pieces 119 and 121, which on the movement of the bar to the position shown in dot and dash lines, engage insulated contact plates 120, 120, and 122, 122. Contact plates 120, are connected with contact stud 119 and form the economizing switch T, contact plates 122, 122, are connected in parallel with the main motor switch S in the projector motor circuit, and with contact stud 121 form the motor starting switch D.

P is a trip switch in the solenoid circuit of a second machine, and is operated by bar 114. A spring pawl 270 is suitably pivoted to bar 114. When the bar moves to the right the pin 271 rides over the top of the trip lever 272 (which is pivoted at 273) against the tension of spring 274. On bar 114 being moved to the left, pin 271 will push lever 272 against the tension of spring 275 and thus open switch P.

A second sleeved collar 108 which is fixed to shaft 104 carries a spring controlled trip lever with pin 109, which on the rotation of the shaft 104 comes into engagement with a lever 110 which is pivoted at 267 and about which it can partially rotate, against the tension of a spring 268 suitably fixed. The movement of lever 110 causes the separation of two insulated contacts 111, and 112 which are fixed to lever 110 and bracket 113 respectively. These contacts form switch N in the solenoid circuit, of the machine to which it is attached, to enable the operator to de-energize the solenoid at any time; as for example if there are two subjects on one spool, and it is desired to stop after the first picture on this spool. The switch is opened by the first movement of the operating lever from *a* to *b*.

The intermediate shutter comprises the sliding members of leaves 84, 84ᵃ, and which are actuated by a lever 147 (similar to lever 87 of the safety shutter) which engages by means of slots in its ends with pins or studs 86, 86, fixed to extensions of the leaves 84, 84ᵃ. The movement required to close the shutter is communicated by means of a lever 149 pivoted to a stud 159 which is fixed to plate A. The outer end of lever 149 is slotted to engage stud 152 fixed to sliding member 84, the lever being also provided with a roller encased pin 158 suitably placed to be engaged by a cam 150 rigidly fixed to the end of shaft 104. Lever 149 with its roller encased pin 158 is pressed against the edge of cam 150 by the action of a spring 155, which is fixed by studs 156 and 157 on plate A and lever 149 respectively. It will be seen that the rotation of the cam by the operating lever 106 will result in roller encased pin 158 and with it lever 149 being moved to the position shown in dot and dash lines thus causing the intermediate shutter to close. The shutter will be fully closed when pin 158 reaches the top of the cam 150, the further rotation serving to open the safety shutter. A secondary action performed by the movement of lever 149 is to push by means of link 151 a projecting pin 153. This pin passes through a slot 154 in plate A and is rigidly fixed at its other end to the sliding bar 114. Thus bar 114 moves together with lever 149.

The mechanism for locking and unlocking the safety shutter, comprises a locking plate 124 rigidly attached to lever 87 and rotates with same about stud 88, two detents 125 and 126 being formed on the outer edge of the plate so as to engage with locking pawls 127 and 128 respectively. These pawls are pivoted to fixed studs 132 and 133 respectively and are connected together by a spring 131 attached by pins to the pawls as shown; this spring tending to draw the ends of the pawls on to the locking plate 124. Projecting pins 129 and 130, at the ends of the pawls engage slots 135 and 136 respectively, in the plunger extension 134.

It is arranged that only one of the pawls 127 or 128 can be in a position to engage with the locking plate 124, at a time, this being determined by the position of the plunger extension 134. In the normal position, as shown in full lines the safety shutter is closed, and is prevented from being opened manually, owing to plate 124 being locked by pawl 127 engaging detent 125. On the energization of the solenoid E, the plunger 137 is pulled down against the tension of springs 141, 141, thus disengaging pawl 127 from detent 125 of locking plate 124, thereby unlocking the safety shutter, at the same time pawl 128 will come against the locking plate 124 in readiness to engage detent 126 when the locking plate is partially rotated clock-wise by the opening of the safety shutter, by the operating lever 106 being moved from position *b* to *c*. On the completion of the opening of the safety shutter, the detent 126 of the locking plate 124 will engage pawl 128, thus locking the safety shutter in its open position, against the tension of spring 143. On the solenoid becoming de-energized from any cause whatever, the plunger will be drawn upward by the springs 141, 141, thus lifting pawl 128 out of engagement with detent 126, thereby allowing the tension of spring 143 to close the safety shutter. Simultaneously with the lifting up of pawl 128, pawl 127 will come against the locking plate 124 in readiness to engage with the detent 125, when the locking plate is partially rotated counter-clockwise, by the closing of the safety shutter. It will be clearly seen, that the vertical movement of the plunger extension 134 on the energization and de-energization of the solenoid E, results in the locking plate 124, being either freed for movement or locked in the closed or open position of the safety shutter. Thus, the energization of the solenoid will release the locking plate, thereby allowing the safety shutter to be opened, which is then retained in its open position, by the locking mechanism, against the tension of spring 143, as long as the solenoid remains energized. On the de-energization of the solenoid, the locking plate is again released, to allow the safety shutter to close by the action of spring 143, and is prevented from being opened, until the solenoid is again energized.

We will now describe another alternative or modified arrangement of the safety and intermediate shutters described in Patent No. 1,384,947. By this method of construction the mechanism mounted on supporting plate A occupies less space. This will render it convenient to fix the apparatus to certain styles of projecting machines.

Figure 20:
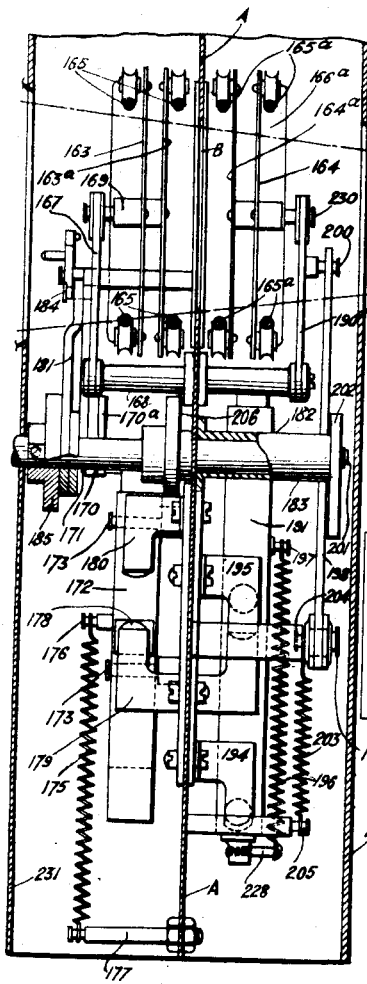
Fig. 20 is a side view of the mechanism shown in Figs. 18 and 19.

Referring particularly to Figs. 18, 19 and 20, the two shutters are constructed in a similar manner, to those in the modified arrangement previously described. In the normal position leaves 163, 163ᵃ, hereinafter termed the safety shutter close the aperture B in plate A; whilst leaves 164, 164ᵃ, hereinafter termed the intermediate shutter remain open. The leaves 163, 163ᵃ, are actuated by the levers 167, and 167ᵃ, which are pivoted to studs 168, 168ᵃ. The slotted ends of the upper arms of levers 167, 167ᵃ, engage with studs 169, 169ᵃ, fixed to leaves 163, 163ᵃ, respectively and the slotted ends of the lower arms of levers 167, 167ᵃ, engage a stud 171 fixed to the end of a slidable bar 172. This bar is slidably mounted by means of slots 174, 174, and studs 173, 173, fixed to the plate A. The bar 172 is normally held down by the tension of spring 175 fixed to stud 176 on bar 172 and to a stud 177 fixed to plate A, the spring thus tending to keep the aperture B covered by the leaves 163, 163ª. The slidable bar 172 is provided with an insulated double ended stud or contact piece 178, which in the normal position of the bar 172, shown in full lines makes contact with two insulated contact plates 179, 179 and forms the hall light switch R. In the alternate position of bar 172 the contact piece 178 closes the circuit between the insulated contact plates 180, 180, and forms the main motor switch S. The lifting of bar 172 by the movement of arms 167, 167ª is transmitted by means of a short lever 181 pivoted on a shaft 182 which revolves in a sleeve 183 fixed to plate A. The outer end of lever 181 is slotted to engage with a stud 184 fixed to the upper arm of lever 167. Shaft 182 is provided with a fixed collar 185 having a projecting pin 186 fixed to one face of the collar, this pin engaging with arm 181 after a partial revolution of shaft 182 has been made by means of a lever, hereinafter referred to as the operating lever 187, fixed to the end of shaft 182 which projects outside the cover 231. The engagement of pin 186 with arm 181 at 189 takes place when operating lever 187 is brought to the position (b) from the normal position at (a); thus the leaves 163, 163ª, are opened and the bar 172 lifted by the movement of the operating lever 187 from position (b) to position (c). This movement is ordinarily prevented by locking and unlocking mechanism to be hereinafter described.

The intermediate shutter comprises the leaves 164, 164ª, which are provided with studs 230, 230ª, and are actuated by levers 190, 190ª, in a similar manner to that described for the safety shutter leaves 163, 163ª. A slidable bar 191 similar to 172 is provided with two insulated contact pieces 192, 193 making contact on movement of bar 191, between two pairs of insulated contact plates 194, 194 and 195, 195 respectively. Contact piece 193 with plates 195, 195 form the motor starting switch D, the plates 195, 195 being connected in parallel with main motor switch S, and contact piece 192 with plates 194, 194 form the economizing switch T. The movement required to close the intermediate shutter leaves 164, 164ª and to move bar 191 against the tension of a spring 196, one end of which is fixed to a stud 197 on which bar 191 slides, the other end being fixed to a pin 228 which is fixed to the bar itself, is communicated by means of a lever 198 pivoted to a fixed stud 199, and by a slot in its long arm engaging a stud 200, fixed to the upper arm of lever 190. A roller encased pin 201 is fixed to the long arm of the lever 198 in such a way as to press against a cam 202, by the action of a spring 203, which is fixed to a pin 204 at the end of the short arm 229 of lever 198, the other end being attached to a stud 205 fixed to plate A. Cam 202 is fixed to the end of the shaft 182 which projects through the fixed sleeve 183. The rotation of the cam causes lever 198 to be moved to the position shown in dot and dash lines, the end of the long arm of which closes the leaves 164, 164ª, of the intermediate shutter, and levers 190, 190ª, push down the bar 191 until the roller encased pin 201 reaches the top of the cam, when the shutter leaves, slidable bar 191 and lever 198 are retained in this position during the further rotation of shaft 182 for the purpose of opening the safety shutter. A collar 206 is fixed to shaft 182 and provided with a spring controlled rocking trip lever 207 suitably placed to engage, on the rotation of shaft 182, with a lever 208, so as to open switch (N), which is in the solenoid circuit.

The mechanism for locking and unlocking the safety shutter comprises a locking plate 209 rigidly attached to lever arm 167ª, and rotates with same about stud 168ª, two detents 210, 211 being formed on the outer edges of the plate, so as to engage with locking pins 212, 213, fixed in the ends of pawl-levers 215, 214 respectively. These pawl levers are pivoted to fixed studs 216, 217 and tend to be held against locking plate 209 by a spring 222 having its ends fixed by pins 223, 224, to the pawl levers. It is arranged that only one locking pin can be in a position to engage with the locking plate 209 at a time, this being determined by the position of an extension 225 of solenoid plunger 226, the extension being provided with slots 220, 221, engaging pins 219, 218 which are fixed to pawl levers 215, 214 respectively. The operation of this locking and unlocking mechanism is similar to that of the modified arrangement previously described. Switch P is similar in construction to switch P as shown in Fig. 15 and serves a similar purpose, i. e., while the intermediate shutter is being closed this switch remains closed, but on the intermediate shutter being opened switch P is momentarily opened and again closed. The form of shutter shown in Fig. 5, could, if desired, be adapted for the safety shutter as shown in Figs. 2 and 15.

In all four arrangements, the aperture or apertures in the casing, which allow the light rays to fall on the film, could be covered over by a metal wire gauze, to prevent any tampering with the mechanism.

The governor mechanism shown in Figs. 13

9 and 10 could serve an additional useful purpose, in indicating the approximate rate of speed at which the projecting machine is running, by providing a suitable pointer in a convenient position so as to allow the pointer to move over a graduated scale.

It is understood that either switch N or the mechanical release (as shown in Figs. 2 and 21) could be used in any of the four arrangements.

It is not necessary for switch P, in second and third arrangements to be a trip.

In the majority of theatres in which cinematograph pictures are exhibited, two machines are employed, alternately, to give what are known as continuous performances, in such a way that when a spool of film has come to an end on one of the machines, the alternate machine continues to show the next spool of film, the hall lights not being switched on between spools.

We will now describe the means we employ when two projecting machines are fitted with our invention, to work alternately in the manner stated above.

According to our invention, we electrically interconnect the two machines. Referring to Fig. 5 it will be seen that a terminal board F is mounted on the supporting plate A. This board is also provided in the other three arrangements although they are not shown, to avoid unnecessary repetition in the drawings. Therefore, in referring to Figs. 5 and 22, it is to be understood that the description for wiring applies practically to all four arrangements. To make this description quite clear, it will be noticed that similar parts such as switches, etc., have the same reference letters, or numerals. In Fig. 5 the internal wiring of the switches and solenoid, which are mounted on the supporting plate A is shown. each switch being designated by a letter, for example: P, from this switch the two leads which go to the terminal board F also mounted on plate A are shown as $P^1$ and $P^2$, while in Fig. 22 switch P is shown on dotted lines, indicating that the contact plates of switch P are connected to the terminals $P^1$ and $P^2$. Terminals are omitted on the resistance and distribution board H, in order to make the circuits more easily understood.

Figure 22:
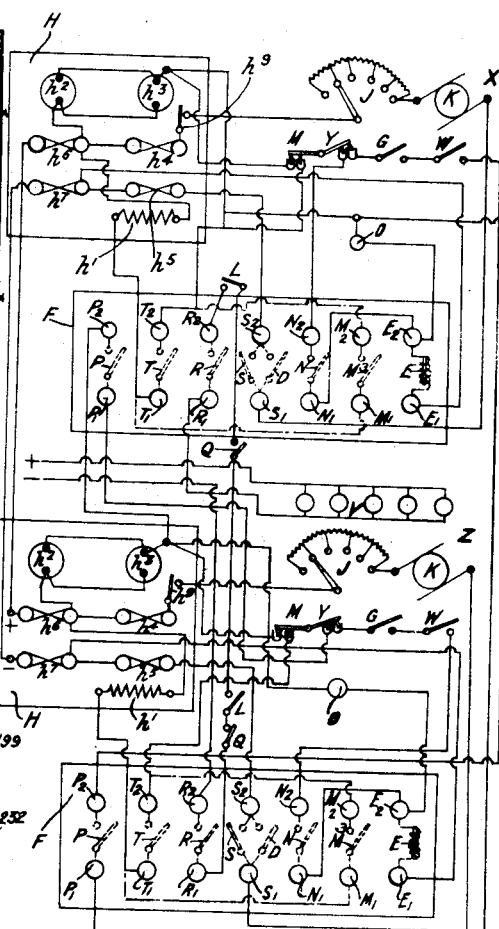
Fig. 22 is a wiring diagram showing the manner of electrically interconnecting two projecting machines.

Referring to Fig. 22 the two projecting machines are shown as X and Z. The upper distribution board H, terminal board F, projector motor K, motor regulator J, switches L, Y, G, W, Q, $M^3$, and lamp O belong to machine X whilst the lower corresponding ones belong to machine Z. The hall lights are shown as V (and any other lamps of course could be included in the same circuit.) As machine X is wired similar to machine Z we will therefore, to avoid repetition, only describe the connections for one of the machines, and with the same description the connections for the other machine can be easily followed.

For the sake of convenience we will consider the wiring of the machine Z, as the mains start from the distribution board H of this machine. It will be observed that there are two fuses on each main lead. $h^4$, $h^5$ are in the projector motor circuit, and $h^6$, $h^7$, which are in the solenoid circuit, are able to carry a much heavier current, than those in the projector motor circuit, for reasons previously mentioned.

We will first consider the motor circuit. The main positive lead after passing through the two fuses $h^6$ and $h^4$ passes through a switch $h^9$ and then passes through the motor regulator J, thence to one terminal of the motor K, and from the other terminal of the motor to $S^1$, then from $S^2$ through the two fuses $h^5$, and $h^7$, the latter being connected to the main negative lead. $S^1$ and $S^2$ are connected to the main motor switch S and also the motor starting switch D. As previously mentioned the letter placed between each pair of terminals on board F, represents the switch to which these terminals are connected.

We will now consider the solenoid circuit. The main positive lead after passing through the fuse $h^6$ passes through the lamps $h^2$, $h^3$, which serve as a resistance, and are wired in parallel. From here to $P^2$ on the terminal board F of machine X, then from $P^1$ through the switches Y, G and W thence to $N^2$ and from $N^1$ to $E^2$ which is connected to one end of the solenoid coil E, then from $E^1$ which is connected to the other end of the solenoid through the fuse $h^7$ the latter being connected to the main negative lead. The resistance $h^1$ is connected in parallel with the lamps $h^2$, $h^3$, for the purpose of allowing a heavier current to pass through the solenoid, but as soon as the solenoid is fully energized, $h^1$ is cut out by switch T and/or $M^3$. Of course it is obvious, that both switches T and $M^3$ need not be employed together, therefore the alternative wiring is shown in dot and dash lines. When T and M are both used they are connected in series.

To minimize the destructive effect of the sparking when any switch in the solenoid circuit is opened, we provide a high non-inductive resistance "break" O, which might conveniently take the form of a suitable lamp. A lead is taken from one connection of O, to $E^2$ and from the other connection of O, a lead is taken to $P^2$, of the alternate machine X. It is obvious that if one of the switches in the solenoid circuit is opened, the solenoid E, is de-energized, but the circuit is not broken, owing to the current being diverted into O.

Switches $h^9$ on board H, of machine X and

Z which are normally closed, we call contingency switches, and they serve the following purpose:—Should the motor K of either machine X or Z get out of order, thus rendering it necessary for the machine to be hand driven, the current to this motor is switched off by $h^9$ (switches $h^9$, $h^9$, could be dispensed with if the motor regulators J, J, were provided with a switch off position). The operation in such a contingency would be as follows:—Assuming that the motor K, of machine Z has got out of order, the current is switched off by $h^9$ on the lower board H. The operator then commences to crank the machine, and when the desired speed is reached, he moves down the operating lever and proceeds in the manner hereinafter described.

The hall light mains are shown separate because in the majority of cases this circuit is tapped from the public mains, besides the current is very often of the alternating kind, but for the sake of convenience we have used the same signs as for direct or continuous current. These mains are shown just above the distribution board H, of machine Z, the positive of which after passing through the lamps V, is connected in series through switches R, L and Q of machine X, thence in series through switches L, Q and R of machine Z, and from there it joins the negative main. The fuses are not shown as they would be on the main distribution board.

We will now describe the operation of two machines electrically interconnected in the manner just described and will continue to refer to them as X and Z. We will only describe the electrical operation; the mechanical operation having been fully described previously. Our description will apply to either the safety and auxiliary shutter arrangement as shown in Figs. 2, 5 or either of the three modified arrangements.

Before commencing a performance the following switches will be closed.

$h^9$, contingency switch in the projector motor circuits of machines X and Z.

G the film operated switch as shown in Figs. 7 and 8 in machines X and Z, if it is controlled by the solenoid plunger previously mentioned.

P in the solenoid circuit of each alternate machine, that is to say P of machine X is in the solenoid circuit of machine Z, and P of machine Z is in the solenoid circuit of machine X, so that if P of machine X is opened, the solenoid of machine Z will be de-energized and vice-versa.

W, when provided as shown in Figs. 11, 12, 13, 14, in the solenoid circuits of machines X and Z.

N, emergency switch in the solenoid circuits of machines X and Z, when not fitted with mechanical trip release.

T, and/or $M^3$, economizing switches in the solenoid circuits of machines X and Z. The purpose of these switches has been previously described. It may be noted that switch T would be normally closed only in the two arrangements shown in Figs. 2 and 21; switch $M^3$ would be normally closed in all four arrangements.

R, L and Q in the hall light circuit of both machines X and Z.

The following switches will be open:—

S, main motor switch of machines X and Z.

D, motor starting switch of machines X and Z.

Y, the governor operated switch in the solenoid circuits of machines X and Z.

G, the film operated switch as shown in Figs. 5, 7, 8, in the solenoid circuits of machines X and Z.

T, economizing switch (in either of the two modified arrangements of the safety and intermediate shutters as shown in Figs. 15 and 19) in the solenoid circuits of machines X and Z.

The safety shutter covers the aperture B in the supporting plate A of machines X and Z. Assuming that machine X will show the first spool, the operator "strikes the arc" in the lamp house of this machine, and then threads the film. On the signal being given to commence the performance, the operating lever is moved downward from $a$ to $b$ whereby the motor starting switch D, and the film switch G as shown in Figs. 5, 7, 8, are closed, also switch T is closed in either of the two modified arrangements shown in Figs. 15 and 19.

The motor K now commences to drive the machine; the regulating device J is operated to obtain the desired speed, and on the machine reaching this speed, the centrifugal or pneumatic governor driven by the machine closes switch Y, thus completing the solenoid circuit. If the automatic delay action switch M, as shown in Figs. 9, 10, is employed, it is automatically opened, but if switch T only is employed, it has to be opened manually by the operating lever, in the manner previously described. The safety shutter can now be opened, and in doing so the main motor switch S is closed, and the hall light switch R is opened. The picture will now be on the screen.

Machine Z may then be threaded in the ordinary manner, and when the film on machine X is nearing the end, the operator "strikes the arc" in the lamp house of machine Z. He then goes through the same operation as he did with machine X, but now an additional electrical operation takes place. Almost simultaneously with the screening of the picture from machine Z, switch P on this machine opens, whereby the solenoid E, of machine X is de-energized thus closing the safety shutter and stopping the motor K of this machine. Switch P of machine Z again closes by the time the operating lever reaches its normal position at $a$ to enable machine X to be again started at any time. The operation of the hall light switches L, Q, R of machines X and Z have been previously described.

Referring to Fig. 23, we will now describe a modification to enable the hall lights to be controlled by manual operation. By this arrangement the hall lights will not be restored automatically as described with reference to Figs. 2 and 5. A switch lever 621 is pivoted and is provided with a pin 622. A lever 623 has a notch 624 at its lower end. A further lever 625 is pivoted and provided with a pin 626, and a pin 627 is fixed to the link 406. The device operates as follows:— The switch U is connected in series with switch R and switches L and Q (Figs. 2 and 5) are not required. Normally switch U is closed, and will be only opened when the operating lever reaches the position $c$, when both switches R and U will be opened. When the lever is moved to the position $c$ a pin 628 will depress the end of the lever 621 thereby opening the switch U. This switch will then be retained in this position owing to the notch 624 in the lever 623 engaging over the pin 622.

When it is required to restore the hall lights the operating lever 44 is moved down to position ($b$), so as to operate the lever 403 closing the shutter and causing the pin 627 to engage under the lever 625 thereby turning lever 623 so as to release the pin 622 from the notch 624 and allowing the switch U to close.

What we claim as our invention and desire to obtain by Letters Patent is:—

1. Safety control apparatus for cinematograph and like machines comprising a spring closed shutter disposed between the light and the film, a sliding tractor bar, one or more pairs of electric switch contact members adjacent to said bar, one or more contact connecting members carried by said bar, an operating member for moving the tractor bar so as to close an electric switch to effect the starting of a motor to drive the machine, a governor operated solenoid arranged transversely with respect to said bar, a sliding shutter bar, parallel with the tractor bar, switches associated with the shutter bar, means operated by the solenoid for transmitting sliding movement of the tractor bar to the shutter bar whereby the switches associated with the shutter bar are only operated after the machine has reached a predetermined speed, a member connecting the shutter bar with the shutter whereby the shutter is opened only when the shutter bar is moved.

2. Safety control apparatus for cinematograph and like machines comprising a spring closed shutter disposed between the light and the film, a sliding tractor bar, one or more pairs of electric switch contact members adjacent to said bar, one or more contact connecting members carried by said bar, an operating member for moving the tractor bar so as to close an electric switch to effect the starting of a motor to drive the machine, a governor operated solenoid arranged transversely with respect to said bar, a sliding shutter bar parallel with the tractor bar, a catch for automatically retaining the shutter bar in the position in which it keeps the shutter open which catch is automatically released upon the solenoid becoming de-energized, switches associated with the shutter bar, means operated by the solenoid for transmitting sliding movement of the tractor bar to the shutter bar whereby the switches associated with the shutter bar are only operated after the machine has reached a predetermined speed, a member connecting the shutter bar with the shutter whereby the shutter is opened only when the shutter bar is moved.

3. Safety control apparatus for cinematograph and like machines comprising a spring closed shutter disposed between the light and the film, a slidable tractor bar, one or more pairs of electric switch contact members adjacent to said bar, one or more contact connecting members carried by said bar, an operating member for moving the tractor bar so as to close an electric switch to effect the starting of a motor to drive the machine, a governor operated solenoid arranged transversely with respect to said bar, a sliding shutter bar parallel with the tractor bar, switches associated with the shutter bar, means for arresting the sliding movement of the tractor bar which means are released when the solenoid becomes energized, means operated by the solenoid for transmitting sliding movement of the tractor bar to the shutter bar whereby the switches associated with the shutter bar are only operated after the machine has reached a predetermined speed, a member connecting the shutter bar with the shutter whereby the shutter is opened only when the shutter bar is moved.

4. Safety control apparatus for cinematograph and like machines comprising a spring closed shutter disposed between the light and the film, said shutter comprising a pair of leaves supported by rollers mounted on guides, a sliding tractor bar, one or more pairs of electric switch contact members adjacent to said bar, one or more contact connecting members carried by said bar, an operating member for moving the tractor bar so as to close an electric switch to effect the starting of a motor to drive the machine, a governor operated solenoid arranged transversely with respect to said bar, a sliding shutter bar, parallel with the tractor bar, switches associated with the shutter bar, means operated by the solenoid for transmitting sliding movement of the tractor bar to the shutter bar whereby the switches associated with the shutter bar are only operated after the machine has reached a predetermined speed, a member connecting the shutter bar with the shutter whereby the shutter is opened only when the shutter bar is moved.

5. Safety control apparatus for cinematograph and like machines comprising a spring closed shutter disposed between the light and the film, a sliding tractor bar, one or more pairs of electric switch contact members adjacent to said bar, one or more contact connecting members carried by said bar, an operating member for moving the tractor bar so as to close an electric switch to effect the starting of a motor to drive the machine, a governor operated solenoid arranged transversely with respect to said bar, a sliding shutter bar parallel with the tractor bar, switches associated with the shutter bar, said switches including two contact connecting members, which co-operate with two or more pairs of electric switch contact members, means operated by the solenoid for transmitting sliding movement of the tractor bar to the shutter bar whereby the switches associated with the shutter bar are only operated after the machine has reached a predetermined speed, a member connecting the shutter bar with the shutter whereby the shutter is opened only when the shutter bar is moved.

6. Safety control apparatus for cinematograph and like machines comprising a spring closed shutter disposed between the light and the film, a sliding tractor bar, one or more pairs of electric switch contact members adjacent to said bar, one or more contact connecting members carried by said bar, an operating member for moving the tractor bar so as to close an electric switch to effect the starting of a motor to drive the machine, a governor operated solenoid arranged transversely with respect to said bar, a sliding shutter bar parallel with the tractor bar, switches associated with the shutter bar, means operated by the solenoid for transmitting sliding movement of the tractor bar to the shutter bar whereby the switches associated with the shutter bar are only operated after the machine has reached a predetermined speed, a member connecting the shutter bar with the shutter whereby the shutter is opened only when the shutter bar is moved, the motor starting switch being closed by the tractor bar prior to the energizing of the solenoid,—an economy switch for reducing the current passing through the solenoid, a switch in the hall light circuit being opened and a main motor switch for driving the machine being closed after the solenoid has been energized.

7. The combination of a plurality of cinematograph projecting machines each having a safety shutter, retaining means for keeping said safety shutter open, a governor, a solenoid, means whereby said solenoid is energized only when the governor has reached a predetermined speed, means associated with the solenoid for releasing said retaining means when the solenoid is de-energized, means for automatically closing said shutter when the retaining means is released, operating means for opening said safety shutter, a switch associated with said operating means said switch being in the solenoid circuit of an adjacent machine whereby upon the opening of the safety shutter of one machine, the safety shutter of said adjacent machine is closed.

8. A cinematograph machine comprising a normally closed safety shutter, electrically operated means for driving said machine and for retaining said safety shutter in an open position while the machine is running, a switch in the electric circuit of such means, means for operating said switch comprising a shaft mounted for endwise movement, said shaft carrying two gear wheels one of which is mounted upon a helical thread upon said shaft, an intermittent motion sprocket for driving the film, said sprocket driving one of said gear wheels, a second sprocket located upon the opposite side of the gate of said machine from the side where the intermittent motion sprocket is disposed, said second sprocket being adapted to be driven by the film and also driving the other gear wheel on said shaft.

9. A cinematograph machine having a safety shutter, retaining means for keeping said shutter open, a solenoid, means associated with said solenoid for releasing said retaining means when said solenoid is de-energized, operating means for said safety shutter, an auxiliary shutter associated with said safety shutter and arranged to open and close therewith, and means whereby the auxiliary shutter is closed automatically independently of the closing of the safety shutter, when the solenoid is de-energized.

10. A cinematograph machine having a safety shutter, retaining means for keeping said shutter open, a solenoid, means associated with said solenoid for releasing said retaining means when said solenoid is de-energized, operating means for said safety shutter, an auxiliary shutter associated with said safety shutter and arranged to open and close therewith, and means whereby the auxiliary shutter is closed automatically independently of the closing of the safety shutter, when the solenoid is de-energized, and a manually operable release whereby said auxiliary shutter may be closed by hand when required.

11. A cinematograph machine having a safety shutter, retaining means for keeping said shutter open, a solenoid, means associated with said solenoid for releasing said retaining means when said solenoid is de-energized, operating means for said safety shutter, an auxiliary shutter associated with said safety shutter and arranged to open and close therewith, and means whereby the auxiliary shutter is closed automatically independently of the closing of the safety shutter, when the solenoid is de-energized, and means for preventing the re-opening of the auxiliary shutter until the safety shutter is first closed and then re-opened.

12. A cinematograph machine having a safety shutter, retaining means for keeping said shutter open, a solenoid, means associated with said solenoid for releasing said retaining means when said solenoid is de-energized, operating means for said safety shutter, an auxiliary shutter associated with said safety shutter and arranged to open and close therewith, and means whereby the auxiliary shutter is closed automatically independently of the closing of the safety shutter, when the solenoid is de-energized, and means for preventing the re-opening of the safety shutter if the auxiliary shutter fails to close.

13. A cinematograph machine having a safety shutter, retaining means for keeping said shutter open, a solenoid, means associated with said solenoid for releasing said retaining means when said solenoid is de-energized, operating means for said safety shutter, an auxiliary shutter comprising pivotally mounted leaves associated with said safety shutter and arranged to open and close therewith, means whereby the auxiliary shutter is closed automatically independently of the closing of the safety shutter, when the solenoid is de-energized, and a manually operable release whereby said auxiliary shutters may be closed.

14. A cinematograph machine having a safety shutter, retaining means for keeping said shutter open, a solenoid, means associated with said solenoid for releasing said retaining means when said solenoid is de-energized, operating means for said safety shutter, an auxiliary shutter associated with said safety shutter and arranged to open and close therewith, and means whereby the auxiliary shutter is closed automatically independently of the closing of the safety shutter, when the solenoid is de-energized, and a trip lever associated with the operating means, mechanism connecting said trip lever with the safety and auxiliary shutter retaining means whereby said shutters may be released mechanically by moving the operating means.

15. A cinematograph machine having a safety shutter, retaining means for keeping said shutter open, a solenoid, means associated with said solenoid for releasing said retaining means when said solenoid is de-energized, operating means for said safety shutter, an auxiliary shutter associated with said safety shutter and arranged to open and close therewith, and means whereby the auxiliary shutter is closed automatically independently of the closing of the safety shutter, when the solenoid is de-energized, and a trip lever associated with the operating means, mechanism connecting said trip lever with the safety and auxiliary shutter retaining means whereby said shutter may be released mechanically by moving by the operating means, said trip lever being operative only during a portion of the movement of the operating means.

16. Safety control apparatus for cinematograph machines comprising a safety shutter, an auxiliary shutter, means for closing said shutters, retaining means for preventing the opening of said shutters, an electrically operated device controlled by a governor for releasing said retaining means when the machine is running at a safe speed, an intermittent sprocket, a bottom sprocket, a loop of film between said sprockets, a switch in the circuit of the electrical device, a take up spool for the film, a length of film between the bottom sprocket and said spool, means associated with said loop and length of film, whereby the means for closing said auxiliary shutter and said switch are operated either when said loop of film tightens or when said length of film slackens.

17. Safety control apparatus for cinematograph machines comprising a safety shutter, an auxiliary shutter, means for closing said shutters, retaining means for preventing the opening of said shutters, an electrically operated device controlled by a governor for releasing said retaining means when the machine is running at a safe speed, an intermittent sprocket, a bottom sprocket, a loop of film between said sprockets, a switch in the circuit of the electrical device, a take up spool for the film, a length of film between the bottom sprocket and said spool, means associated with said loop of film and means associated with said length of film whereby the means for closing said auxiliary shutter and said switch are operated either when said loop tightens or when said length of film slackens, and a pin associated with said electrical device adapted to act directly to reset said means for closing said auxiliary shutter after it has been operated by said means associated with said loop of film or said length of film.

18. Safety control apparatus for cinematograph machines comprising a safety shutter, a sliding shutter bar associated with said shutter, a governor controlled electrically operated device for releasing the shutter when the machine is running at a safe speed, a switch in the circuit of said device, an operating member for said shutter, a trip lever associated with said operating member, means associated with said trip lever and with said shutter bar, means associated with said trip lever and with said switch whereby said trip lever is permitted to release said shutter bar and operate said switch.

19. Safety control apparatus for cinematograph machines comprising a motor, a starting switch for said motor, a governor associated with said motor, an electrically operated device adapted to be energized by said governor only when the motor is running at a safe speed, a safety shutter, a member for operating said shutter, means whereby the initial movement of said operating member closes the motor starting switch, a non-prohibitive stop associated with said operating member for checking its motion at the end of said initial movement, and means whereby further movement of the operating member moves the safety shutter.

20. In a cinematograph machine the combination of a shaft driven from a rotating part of the machine, a crank on said shaft, a fluid pressure pump operated by said crank, a vessel connected to said pump by a pipe, a piston in said vessel, a leak valve in said vessel, a link operated by said piston, a pivot, a counter-weight on said pivot, a switch arm mounted on said pivot, two sets of contacts on said arm, stationary contacts co-operating with the contacts on said arm, a pin and slot connection between said counterweight and said link whereby the contacts are operated in accordance with the speed of the pump.

21. In a cinematograph machine the combination of a shaft driven from a rotating part of the machine, a crank on said shaft, a fluid pressure pump operated by said crank, a vessel connected to said pump by a pipe, a piston in said vessel, an adjustable leak valve in said vessel, a link operated by said piston, a pivot, a counterweight on said pivot, a switch arm mounted on said pivot, contacts at each end of said arm, stationary contacts co-operating with the contacts on said arm, said contacts constituting two switches, a pin and slot connection between said counterweight and said link whereby one switch is opened as the other is closed in accordance with the speed of said shaft.

22. In cinematograph apparatus, having an automatic safety shutter, a switch in the hall light circuit, a movable operating member adapted to operate said switch, spring means acting on said operating member and tending to open said switch, a lever associated with said movable operating member and with a loop of film for normally keeping said movable member in a position to retain the switch closed, whereby upon the alteration of said film tension due to defect in the running of the film, said lever releases said operating member and allows the switch to open under spring pressure.

23. In cinematograph apparatus, having an automatic safety shutter, a switch in the hall light circuit, a movable operating member adapted to operate said switch, spring means acting on said operating member and tending to open said switch, a lever associated with said movable operating member and with a loop of film for normally keeping said movable member in a position to retain the switch closed, whereby upon the alteration of said film tension due to defect in the running of the film, said lever releases said operating member and allows the switch to open under spring pressure, and means for automatically closing said switch when the safety shutter is reopened.

24. The combination of a plurality of cinematograph projecting machines each having a safety shutter, retaining means for keeping said safety shutter open, a governor, a solenoid, means whereby said solenoid is energized only when the governor has reached a predetermined speed, means associated with the solenoid for releasing said retaining means when the solenoid is de-energized, means for automatically closing said shutter when the retaining means is released, operating means for opening said safety shutter, a switch associated with said opening means said switch being in the solenoid circuit of an adjacent machine whereby upon the opening of the safety shutter of one machine, the safety shutter of said adjacent machine is closed, a hall light circuit, switches in said circuit associated with the safety shutter operating mechanism of each machine, whereby said circuit is broken by the initial movement of the safety shutter operating mechanism of either machine.

25. Safety control apparatus for cinematograph and like machines comprising a spring closed shutter disposed between the light and the film, a sliding bar, one or more pairs of electric switch contact members adjacent to said bar, one or more contact connecting members carried by said bar, an operating member for moving the sliding bar so as to close an electric switch to effect the starting of a motor to drive the machine, a governor operated solenoid arranged transversely with respect to said bar, a sliding shutter bar parallel with the tractor bar, switches associated with the shutter bar, means operated by the solenoid for transmitting sliding movement of the tractor bar to the shutter bar whereby the switches associated with the shutter bar are only operated after the machine has reached a predetermined speed, a member connecting the shutter bar with the shutter whereby the shutter is opened only when the shutter bar is moved, and means whereby the solenoid operated transmitting means is released at any position of the operating member when the solenoid is de-energized.

26. Cinematograph apparatus comprising an operating member, a safety shutter, locking means for said shutter, a shutter bar having switches, a solenoid for releasing said locking means when the machine reaches a safe speed, said operating member first moving the shutter bar and operating its switches and subsequently acting directly upon the safety shutter so as to open the same.

27. Cinematograph apparatus comprising an operating member, a safety shutter, locking means for said shutter, a shutter bar having switches, a solenoid for releasing said locking means when the machine reaches a safe speed, said operating member first moving the shutter bar and operating its switches and subsequently acting directly upon the safety shutter so as to open same, the connection between the safety shutter and the operating member being released at any position of the latter when the solenoid is de-energized, allowing the shutter to close.

28. Cinematograph apparatus comprising an operating member, a safety shutter, locking means for said shutter, a shutter bar having switches, a solenoid for releasing said locking means when the machine reaches a safe speed, said operating member first moving the shutter bar and operating its switches and subsequently acting directly upon the safety shutter so as to open same, the connection between the safety shutter and the operating member being released at any position of the latter when the solenoid is de-energized, allowing the shutter to close and the shutter bar to move back to its normal position either together or independently.

29. Cinematograph apparatus comprising an operating member, a safety shutter, locking means for said shutter, a shutter bar having switches, a solenoid for releasing said locking means when the machine reaches a safe speed, said operating member first moving the shutter bar and operating its switches and subsequently acting directly upon the safety shutter so as to open same, a mechanical trip lever associated with said operating member and mechanism associated with said trip lever whereby the operating member may be moved to successively release the shutter for closing and to release the shutter bar.

30. In cinematograph apparatus of the type described a manually operable switch to control the hall lights comprising a switch lever adapted to be actuated by the operating lever to open the switch, a pivoted lever adapted to engage and retain the switch in the open position and means for releasing the switch to restore the hall lights when required by the initial movement of the operating lever.

ROY MARCUS GEYER.
WILLIAM HERBERT TRIPP.